(12) United States Patent
Cornford

(10) Patent No.: US 8,732,095 B2
(45) Date of Patent: May 20, 2014

(54) GENERIC SYSTEM, METHOD AND DEVICE FOR DELINEATING ECOSYSTEM PROCESS INTERDEPENDENCIES, TRADEOFFS AND BEST PRACTICES

(76) Inventor: Alan Bruce Cornford, West Vancouver (CA)

( * ) Notice: Subject to any disclaimer, the term of this patent is extended or adjusted under 35 U.S.C. 154(b) by 311 days.

(21) Appl. No.: 12/750,705

(22) Filed: Mar. 30, 2010

(65) Prior Publication Data
US 2010/0312571 A1    Dec. 9, 2010

Related U.S. Application Data

(60) Provisional application No. 61/164,779, filed on Mar. 30, 2009.

(51) Int. Cl.
*G06F 15/18* (2006.01)
*G06N 3/00* (2006.01)
*G06N 3/12* (2006.01)

(52) U.S. Cl.
USPC .............................................. 706/12; 706/13

(58) Field of Classification Search
USPC .......................................................... 706/794
See application file for complete search history.

(56) References Cited

PUBLICATIONS

CIO Council (Feb. 2001). Federal Enterprise Architecture, Chief Information Officer Council, Version 1.0 (hereinafter "FEA").*
Federal Enterprise Architecture Program Management Office, OMB (2007). FEA Practice Guidance. E-Gov.*

* cited by examiner

*Primary Examiner* — Oluseye Iwarere
*Assistant Examiner* — Peter L Ludwig

(57) ABSTRACT

A system, method and device define ecosystem ontology, architecture, processes, process operands and operand states within a generic hierarchy to simplify navigating system complexity. The invention facilitates identification of key process interdependencies and tradeoff best practices to optimize system workflow, information flow and value flow. It standardizes and aligns architecture, process and maturity models in the prior art.

2 Claims, 29 Drawing Sheets

FIG. 21

| 12 v | Factorial 12 | 1state/v | 4 states/v | 6 states/v | | 4states/v<br>2 var | 4states/v<br>4 var | | 4states/v<br>2 var | 6 states/v<br>6 var | 6 states/v<br>12 var | 6 states/v<br>6 var |
|---|---|---|---|---|---|---|---|---|---|---|---|---|
| 1 | 1 | 1 | 4 | 6 | | 4 | 8 | | 4 | 6 | 12 | 6 |
| 2 | 2 | 1 | 16 | 36 | | 16 | 32 | | 16 | 36 | 72 | 36 |
| 3 | 6 | 1 | 64 | 216 | | 64 | 128 | | 64 | 216 | 432 | 216 |
| 4 | 24 | 1 | 256 | 1,296 | | 256 | 512 | | 256 | 1,296 | 2,592 | 1,296 |
| 5 | 120 | 1 | 1,024 | 7,776 | | 1,024 | 2,048 | | 1,024 | 7,776 | 15,552 | 7,776 |
| 6 | 720 | 1 | 4,096 | 46,656 | | 4,096 | 8,192 | | 4,096 | 46,656 | 93,312 | 46,656 |
| 7 | 5,040 | 1 | 16,384 | 279,936 | | | | | | | | |
| 8 | 40,320 | 1 | 65,536 | 1,679,616 | | | | | | | | |
| 9 | 362,880 | 1 | 262,144 | 10,077,696 | | | | | | | | |
| 10 | 3,628,800 | 1 | 1,048,576 | 60,466,176 | | | | | | | | |
| 11 | 39,916,800 | 1 | 4,194,304 | 362,797,056 | | | | | | | | |
| 12 | 479,001,600 | 1 | 16,777,216 | 2,176,782,336 | | | | | | | | |
| | 500 million | 1 | 16 million | 2 billion | | | 8 thousand | | | | 93 thousand | |
| | variable<br>options | | 4 state<br>options | 6 state<br>options | | | 8 | | | | 12 | |

GENERIC SYSTEM, METHOD AND DEVICE FOR DELINEATING ECOSYSTEM PROCESS INTERDEPENDENCIES, TRADEOFFS AND BEST PRACTICES

This Non-provisional Application claims benefit of the earlier Provisional Application series code and Ser. No. 61/164,779, confirmation number 1854 with filing date Mar. 30, 2009.

BACKGROUND OF THE INVENTION

1. Field of the Invention

The world is comprised of many types of complex ecosystems. However trying to define, navigate and optimize aspects of them remains a difficult challenge. The focus of this invention is: (i) a novel generic framework for describing, analyzing and delineating ecosystems, and (ii) a system, method and unique device aiding decision making among processes and process interdependencies that 'that matter most' for optimal ecosystem functioning. While the invention applies to all ecosystems however the (business) enterprise ecosystem is used to illustrate embodiments.

There is a wide range of ecosystems—from large atmospheric, oceanographic and terrestrial systems—to all sizes of physical, chemical, biological and enterprise systems. There is a myriad of representations and models in the prior art, and despite some commonalities, there is little in the way of standard methods that assist navigation and management of these complex systems. This invention addresses complexity to resolve several of the current deficiencies.

All ecosystems and systems are comprised of processes that convert inputs to outputs. This is a 'process-centric' perspective. While some supply chain and logistics chain processes are well understood in business enterprises, few standard definitions exist for most processes, process components, relationships and dynamics. This deficiency has constrained development of common process models and development of 'interoperable' applications for sharing services via service-orientated architectures (SOA) in federations of enterprises.

Understanding processes requires some abstract thinking and an ability to deal with intangible relationships and concepts, something that does not come easy to many of us. Determining cause/effect relationships is challenging. Processes involve a complex myriad of interactions with multiple non-linear feedback loops, flows and interdependencies. As a result there has been limited emphasis on developing standard process knowledgebase's.

Process knowledge is distinct from data and knowledgebase's are distinct from databases, the latter representing only one state of a process at any given place or time. Process knowledge is required to model cause/effect relationships needed to predict outcomes and ecosystem dynamics.

Sets of 2 or 3 process variables may be illustrated at a single time in 2D (planar) or 3D representations. But ecosystem complexity is much greater than this, often involving in the range of 12 or more process variables (i.e. 'N=12' dimensions), each having in the order of 4-6 or more states. Possible combinations and permutations of these may exceed several billion potential state options.

Several methods in the prior art attempt to address the complexity via (i) reusable 'loosely coupled building block' objects, (ii) 'object oriented' (OO) methods, and (iii) a 'simple iterative partitions' (SIP) method of grouping variables. For example, twelve variables each with 6 states produce over $12^6$ or 2 billion state options. However if the variables are partitioned into 2 sets of 6 variables, each having 46,656 states, then there are only 93,312 total states, reducing the complexity by more than 99% without removing any of the variables.

For executive decision-making in enterprise ecosystems, the complexity must be reduced to only a few options. In addition to these, this invention also incorporates: (i) a generic ontology (ii) a hierarchy of generic process operands, (iii) major models and methods in the prior art, and (iv) knowledge acquisition via 'wiki' internet collaboration. Taken together, these six methods—OO, SIP, ontology, generic hierarchy, model alignment and wiki—provide a unique system, method and device for navigating complexity to aid 'informed' decision-making.

For example, the human body system (skeletal) architecture has 12 major systems—pulmonary, cardiac, endocrine etc. Each has a 'nested set' hierarchy of organs, tissues, cells, and proteins—one within the next. Within each of these there is a 'nested set' hierarchy of processes, process operands and states that may be characterized.

Similarly enterprise (business) architecture is a hierarchy of 3 major operands—management; demand/supply and implementation processes. Each has 4 processes for a total of 12 processes in all, each with a hierarchy of process operands and states just as in the first example.

These hierarchies may be readily partitioned as we drill down into process and sub-process detail—a structure common in most ecosystems. This facilitates simplification of complexity and navigation of system composition, interactions and flows. Simplification is also aided by aligning prior art models: (i) business process enterprise architecture (EA) models, (ii) process operation reference models (ORM) and (iii) process maturity models (MM). While each model provides some common perspectives, it rarely provides an integrated perspective of the overall system.

The challenge is similar to that described in the poem—Six Blind Men and the Elephant—by John Saxe. Each blind man touched and described a different portion of an elephant (ecosystem)—the ear, tusk, tail, leg, side, and trunk—and all described a different view and perception of an elephant. All were right in one respect, but all were wrong in characterizing the overall elephant ecosystem. Most models in the literature suffer similarly.

This invention aligns these EA, ORM and MM models in the prior art into one. It defines ecosystems with a single generic structure characterized by 12 operands, 6 of which are generic to any system and 6 of which are process specific. One generic operand describes maturity with six generic states.

Key process operand states 'that matter most' characterize priority objectives. Selections of only a few key states or many states will define key decision 'threads' that may aid process optimization, and/or process interdependency tradeoff decision making. Selection of decision threads linking only the most influential operand states within the hierarchy simplifies complexity and provides focus.

2. Examples of Prior Art

Enterprise architecture reference models in the prior art include the Zachman framework, The Open Group Architecture Framework (TOGAF) the Department of Defense Architecture Framework (DODAF) FEAF; MDA; ARIS and the Service-oriented architecture reference model (SOA/RM). U.S. Pat. No. 7,020,697 1 dated Mar. 28, 2006 by Goodman et al describes an enterprise architecture for net centric computing systems; and US Patent Application Publication US 2006/0136275 A1 dated Jun. 22, 2006 by Cotora describes a method and device for optimizing company structure.

Business process architecture operations reference models include the Supply Chain Council operations reference model (SCOR), the Value Chain Group value reference model (VRM), the Federated Enterprise Reference Architecture (FERA), the Intel Integrated Process and Technology Framework (IPTF) and the American Productivity and Quality Council Process Classification Framework (APQC/PCF). US patent Application Publication US 2007/0038490 A1 dated Feb. 15, 2007 by Joodi describes a method and system for analyzing business architecture; and US Patent Application US 2007/0022404 A1 dated Jan. 25, 2007 by Zhang et al describes a process profiling framework.

Examples of maturity methods include US Patent Application Publication US 2007/0021967 A1 by Jaligama related to the concept of measuring and mapping process maturity levels; US Patent Application Publication US 2005/0159965 A1 of Mann et al describes measurement groups; US Patent Application 2006/0136275 A1 of Cotora describes internal and external value production; U.S. Pat. No. 7,136,792 B2 of Baltz et al describes subjective scoring systems; and US Patent Application US 2007/0027734 dated Feb. 1, 2007 of Hughes describes an enterprise design solution methodology for increasing the maturity level of value chains. There are also maturity methods applied by PRTM Inc., AMR Research Inc., the US Productivity Council and GPT Management Ltd. for innovative capacity as described in U.S. Provisional Patent Applications 60/774,597 Feb. 21, 2006 and 11/676, 305 Feb. 18, 2007 by Cornford.

Methods for assessing process value chains, process interdependences and types of value grid relationships include U.S. Pat. No. 7,206,751 B2 dated April 2007 by Hack et al for a value chain optimization system; U.S. Pat. No. 7,231,400 dated Jun. 12, 2007 by Cameron et al for hierarchies of inter-object relationships based on object attribute values; US Patent Application Publication US 2005/0165822 dated Jul. 28, 2005 by Yeung et al for systems and methods for business process automation, analysis and optimization; US Patent Application Publication US 2005/0159965 dated Jul. 21, 2005 by Mann et al for business analysis and management systems utilizing enterprise metrics; and US Patent Publication Application US 2002/0184067 dated Dec. 5, 2002 by McLean et al which describes a method for measuring and reporting on value creation performance that supports real-time benchmarking.

Methods of enterprise value assessment include work by A. Lemus (Johnson and Johnson ASP): Metrics for Monitoring New Product Development, 2003; A. Lemus (Ameriquest Mortgage Co.): Change Management in New Product Development ('Making it Work'), 2004; D. Hofman (AMR Research Inc.): 'The Hierarchy of Supply Chain Metrics, Supply Chain Management Review Sep. 1, 2004; D. Hofman and J. Hagerty (AMR Research Inc.): Defining a Measurement Strategy Part I, BI Review Magazine, Mar. 1, 2006; Part II, May 1, 2006; Part III, August 2006; K. Frits and M. Holweg: Evolving from the Value Chain to Value Grid, MIT Sloan Management Review, Summer 2006, No 1.47, No. 4 pp. 72-79, Reprint 47414; A. Cornford, edited by R. Lipsey (Atlantic Canada Opportunities Agency): Benchmarking Innovative Capacity: Policy and Practice 2005; and Innovate America (US Council on Competitiveness): National Innovation Initiative and Summit Report 2004, ISBN 1-889866-20-2; publications of IDS Scheer related to business process management (BPM) and Gartner Inc. including 'The Gartner Business Value Model: A Framework for Measuring Business performance', May 31, 2006; ID 600139413.

The prior art describes the use of 'loosely coupled' 'building blocks' and 'component business models' as a basis for defining modular architectures, processes and process service components for service-oriented architectures. These include G. Pohle, P. Korsten and S. Ramamurthy, 2005 (IBM Business Consulting Services): Component Business Models—Making Specialization Real; P. Salz (Accenture): A Modular Approach, 2006; D. Frankel (SAP): A Convergence of Business and IT Thinking": SOA and the Business-IT Divide, MDA (Model Drive Architecture) Journal January 2007; and B. Jaruzleski, K. Dehoff and R. Bordia (Booz, Allen, Hamilton): Smart Spenders: The Global Innovation 1000, S&B 06405, November 2006; and Cornford, U.S. patent application Ser. No. 12/344,350 relating to ecosystem value stream optimization system, method and device.

3. Introduction

This invention defines complex ecosystem structure in terms of a generic framework architecture and process ontology. It defines a system, method and device that assist transparent navigation of processes that convert inputs to outputs for optimizing ecosystem performance. To date there is no standard set of accepted ontology, architecture, process or process operand definitions for the enterprise in the prior art. This invention provides these as a sound basis for standardization. They include: (i) 3 major process (business) architecture operands; (ii) 6 generic process (ecosystem independent) operands; (iii) 6 process specific operands; (iv) 5 process organizational level (SPEAT) operands; (v) tradeoff operands; and (vi) decision operands. Each of these operand sets may be created used or copied by a set of 'function' editors that may access knowedgebase and database directories and files locally and remotely via the internet and wiki protocols.

Enterprise architecture, and specifically business (process) architecture may be described by three architecture operands. These define 3 major categories of processes in the process hierarchy,—'strategic' (management) processes, defining core process competencies and guiding 'core' (demand/supply) processes, which are delivered by balancing resources within 'support' (implementation) processes.

Each of the 3 architecture operands has four operand states which define the four management, four demand/supply and the four implementation processes. For each of these there is a 'nested set' hierarchy of 12 generic process attribute operands common in all ecosystems. Each operand generally has in the order of 4-6 states which often then have sub-states and so on.

Six of the process operands and their states are common to all processes. The other six are process specific and characterize a particular system or domain. Each of these process specific operands states may then be further defined in terms of process levels by a suite of process level sub-operands and their states.

Some or all of the 12 operand states may be linked via knowledge 'threads' through ecosystems at all levels of aggregation—federations of systems, systems, processes—in all kinds of management, physical, chemical and biological systems.

These threads may include only a few key operand states 'that matter most' for driving process value streams via a few value pathways that permit assessment of process interdependencies and tradeoffs. To date there has been no common (enterprise) ecosystem framework structure or ontology in the prior art to accomplish this. This absence has severely limited the ability to assess process interdependencies and development of key performance indicators for process interdependencies that drive most value.

This invention addresses and resolves this need. It aligns and integrates ontology, architecture structure, process structure, process operands, operand states and decision threads within a single, transparent, unified system, method and device. Together these permit transparent assessment of process value outputs, interdependencies guiding tradeoff decisions that may most influence ecosystem overall value. It integrates most major models and methods for architecture, process and maturity in the prior art and has potential to become a standard ecosystem operations reference framework.

CONTEXT FOR THE DRAWINGS

The figures are arranged to progressively describe the unique aspects of the structure and how the overall architecture aligns with aspects of many less comprehensive models or frameworks in the prior art that usually address only a few aspects of business process management—just as the individual perceptions of the six blind men and the elephant in John Saxes' poem may be pieced together to describe the overall elephant that none of them can completely describe. The invention is designed to align with prior art models and interface with software applications used today to enhance their utility.

The first 2 figures describe the software application and the generic framework structure. FIGS. 3-6 focus on (business) architecture structure and examples. FIGS. 7-9 describe generic operands. FIGS. 10-12 describe specific process and process level (SPEAT) operands. FIGS. 13-14 address the 'perspectives' operand and operand states and then FIGS. 15-18 address 'maturity' operand states.

FIGS. 19-24 show a number of device representations and methods and then FIGS. 25-29 show examples of applications that render the invention into practice in a number of domains including health, innovation, alternate energy and emergency measures.

BRIEF DESCRIPTION OF THE DRAWINGS

FIG. 7 also shows a few of these operands to the left side of the figure as they are described in the prior art (RAND Corporation) for several healthcare evaluation frameworks.

Figure 10:
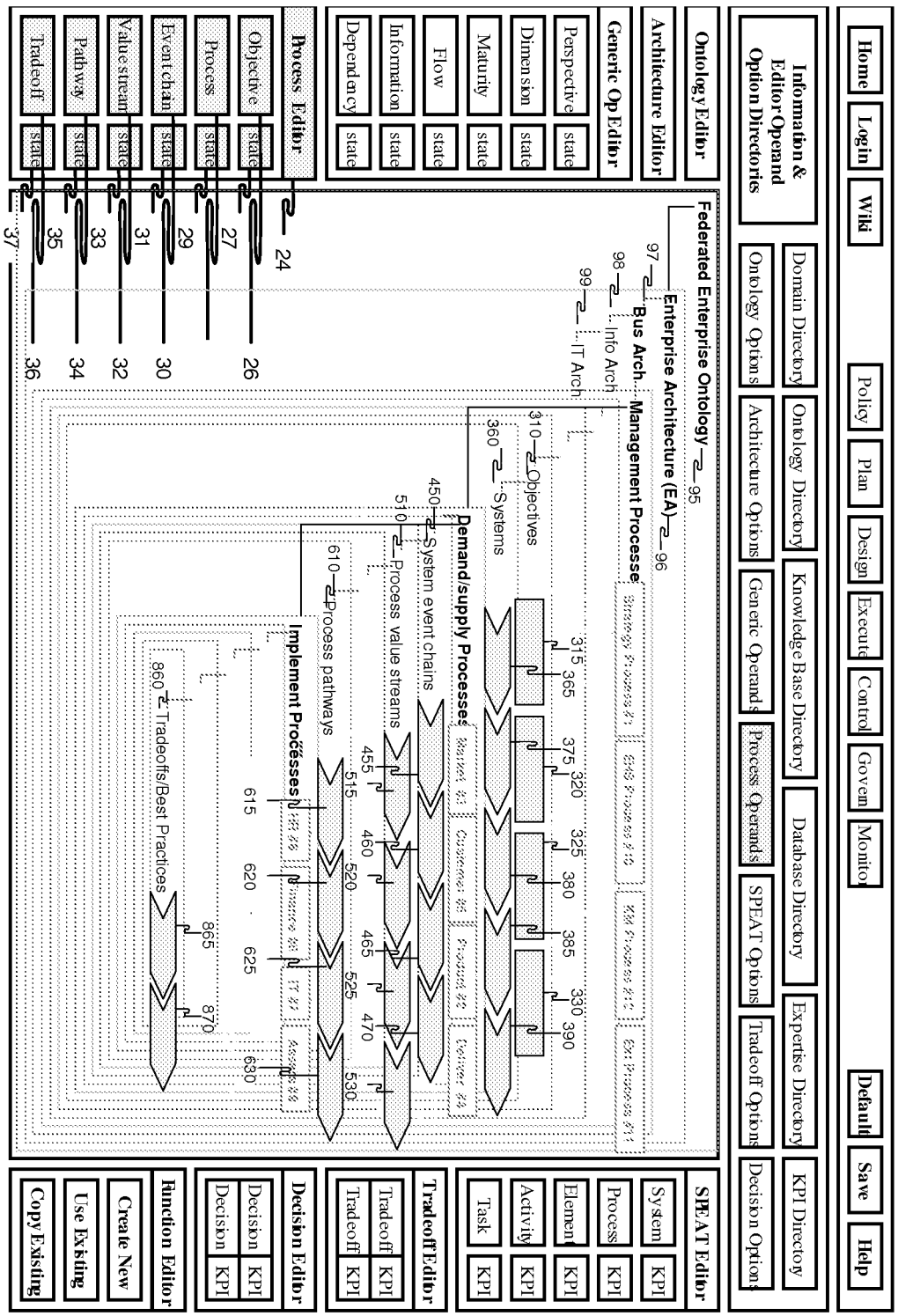

FIG. 10 shows six (6) of the 12 operands which are process specific, that is, they characterize a system and system process domain. These include (i) objectives, (ii) systems, (iii) system event chains, (iv) process value streams, (v) process pathways, and (vi) tradeoffs. The FIG. 8 also shows the specific process operand editor for each of these. Examples of types of process specific operands are shown in applications in FIGS. 25-29.

Figure 11:
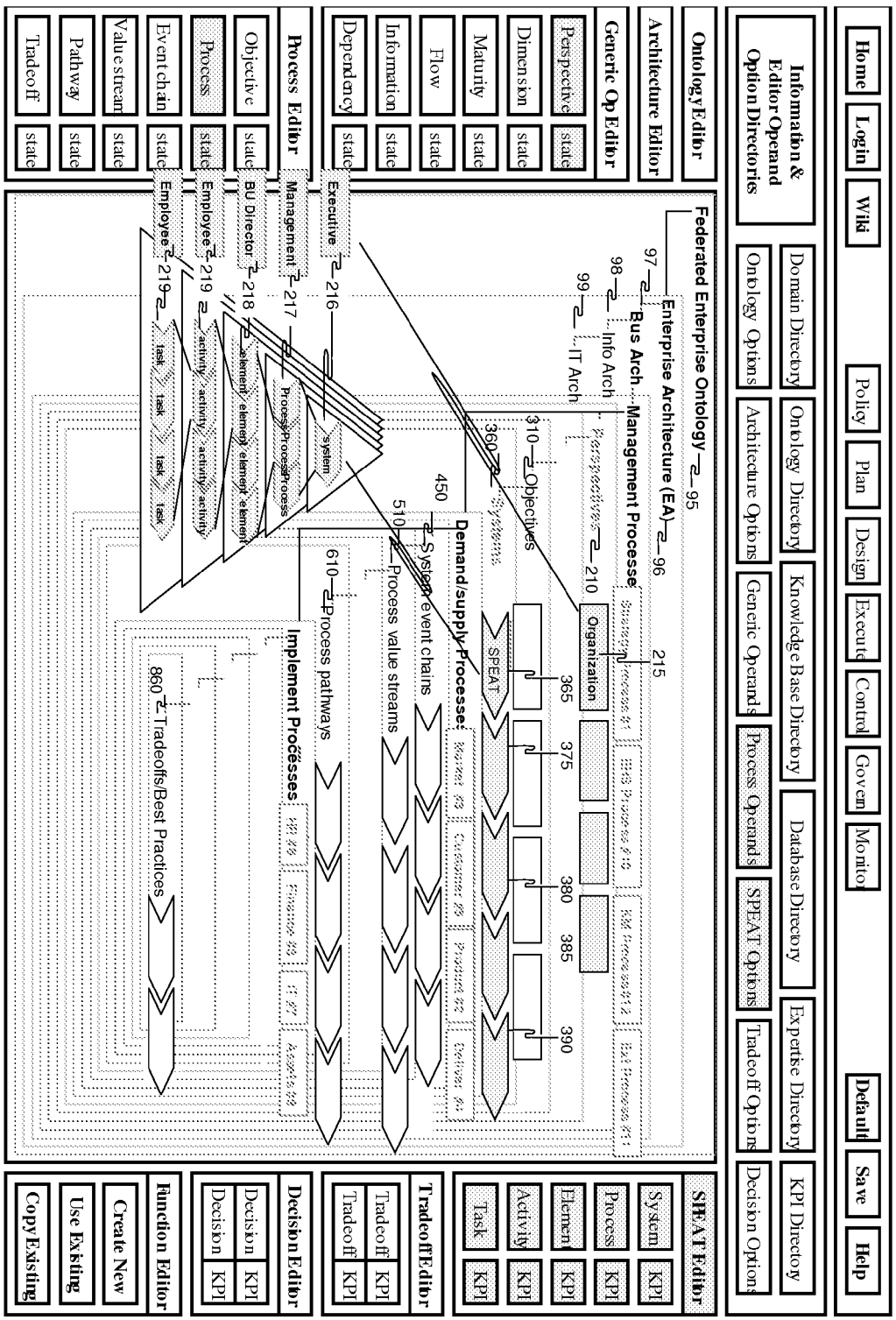

FIG. 11 shows a third set of process level 'SPEAT' operands that characterize process levels—(a) system, (b) process conformation, (c) process element, (d) process element activities, and (e) activity tasks. These process sub-levels align with organizational sub-levels as defined by one of the generic operands—'perspectives'—as shown in FIG. 11.

Figure 12:
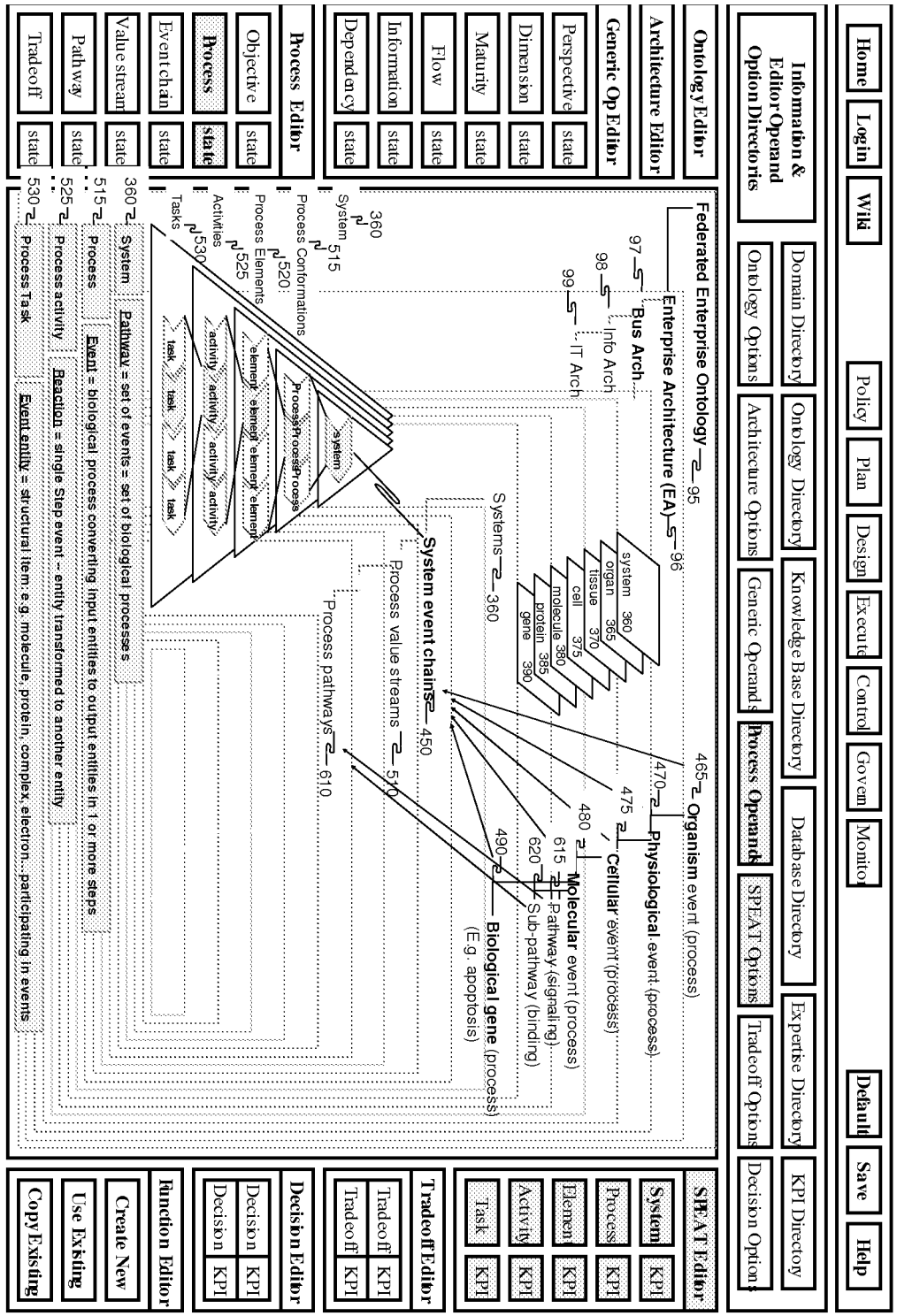

FIG. 12 shows that the enterprise structure in FIG. 11 for enterprise ecosystems also applies for biological (human) ecosystems.

Figure 13:
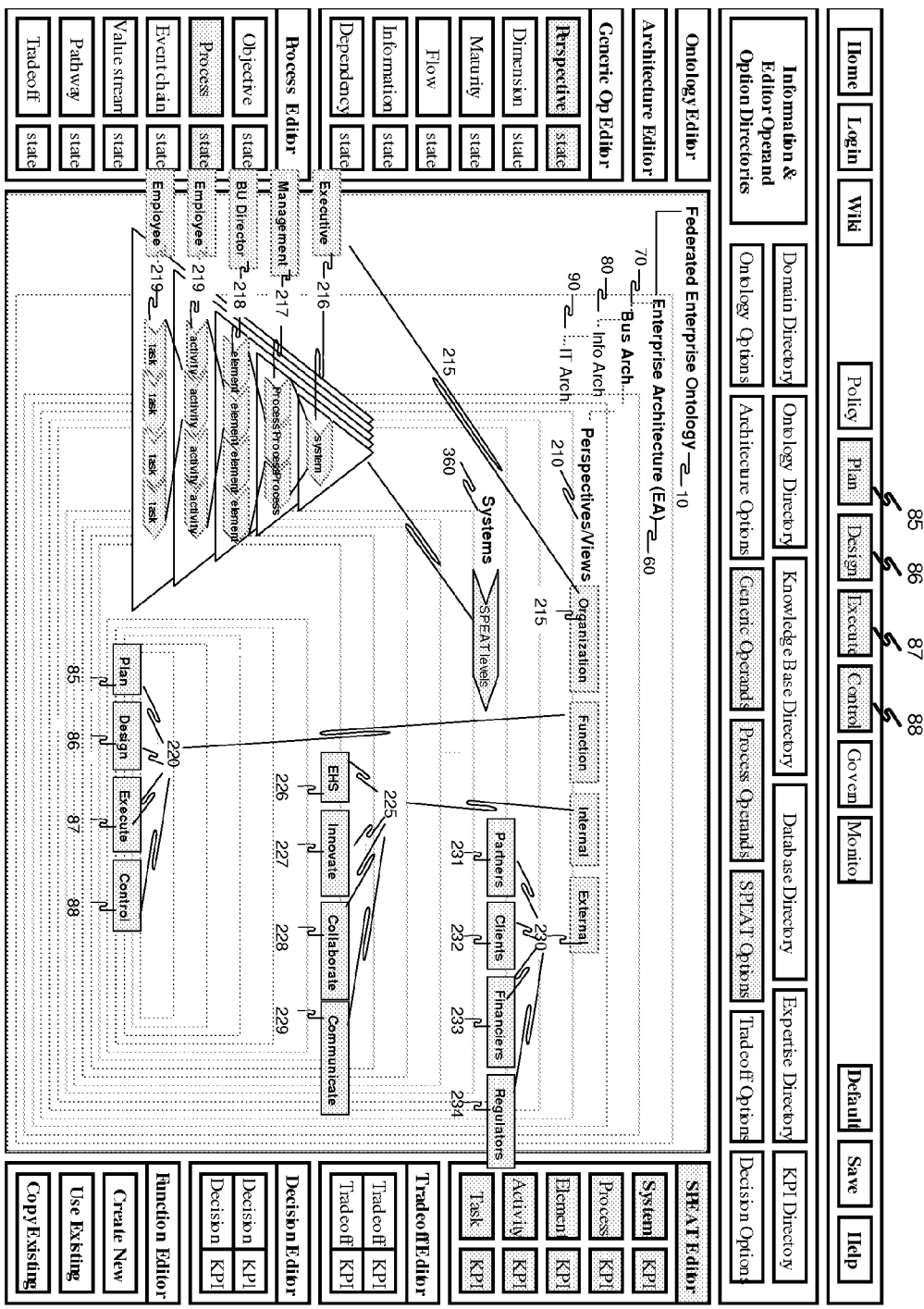

FIG. 13 shows an example of operand states and sub-states that may be registered in the operand directories shown in the upper bar of the dashboard. FIG. 13 shows several sets of perspective/view states and sub-states for: (i) organization, (ii) function, (iii) internal and (iv) external. For example, organization sub-state perspectives are defined in prior art operations process reference models of SCOR and VRM as level 1=executive (system category), Level 2=management (process conformation), Level 3=business unit director (process element) and Level 4=employee (activity and task).

Examples of perspectives sub-states for the function state include (i) plan (management strategy processes), (ii) design/make (demand/supply processes), (iii) execute (implement processes), and (iv) control (also implement environment, health and safety, (ii) innovation and research, (iii) collaborate, and (iv) communication. External sub-state perspectives may include (i) partners, (ii) clients, (iii) financiers, and (iv) regulators.

Figure 14:
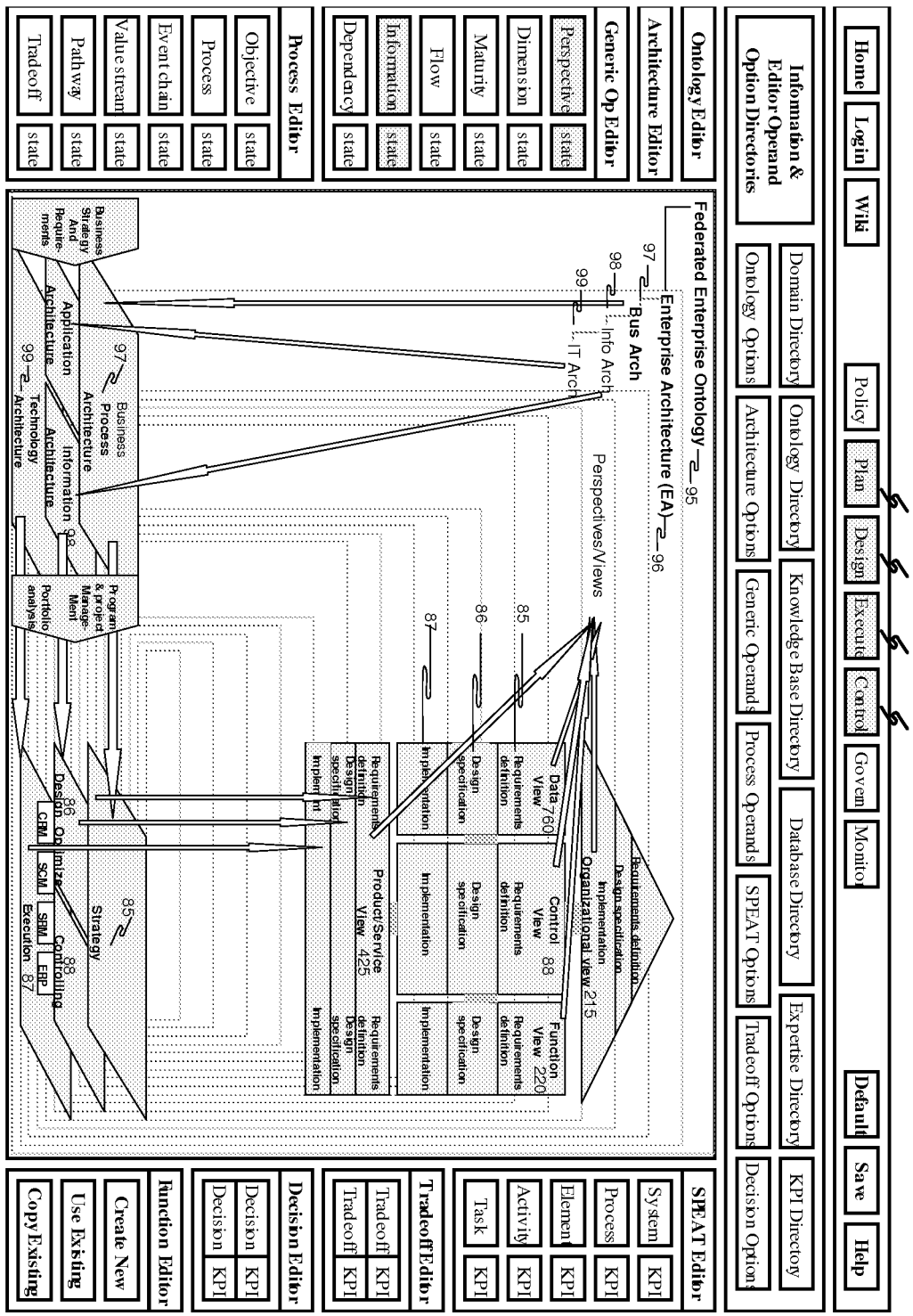

FIG. 14 shows alignment of the framework architecture components and sub-components with comparable sub-components that are illustrated for the IDS Scheer ARIS platform in the prior art. These are also aligned with the 'function' operand sub-states in FIG. 13 and then also aligned with various perspectives/views operand states that are included in the 'ARIS house'. These include: (i) organization view, (ii) function view, (iii) data view, (iv) product/service view, and (v) control view. These are all aspects of the overall framework, but not well aligned in ARIS for simplicity of navigation or use. This challenge for ARIS is also evident in FIG. 18.

Figure 15:
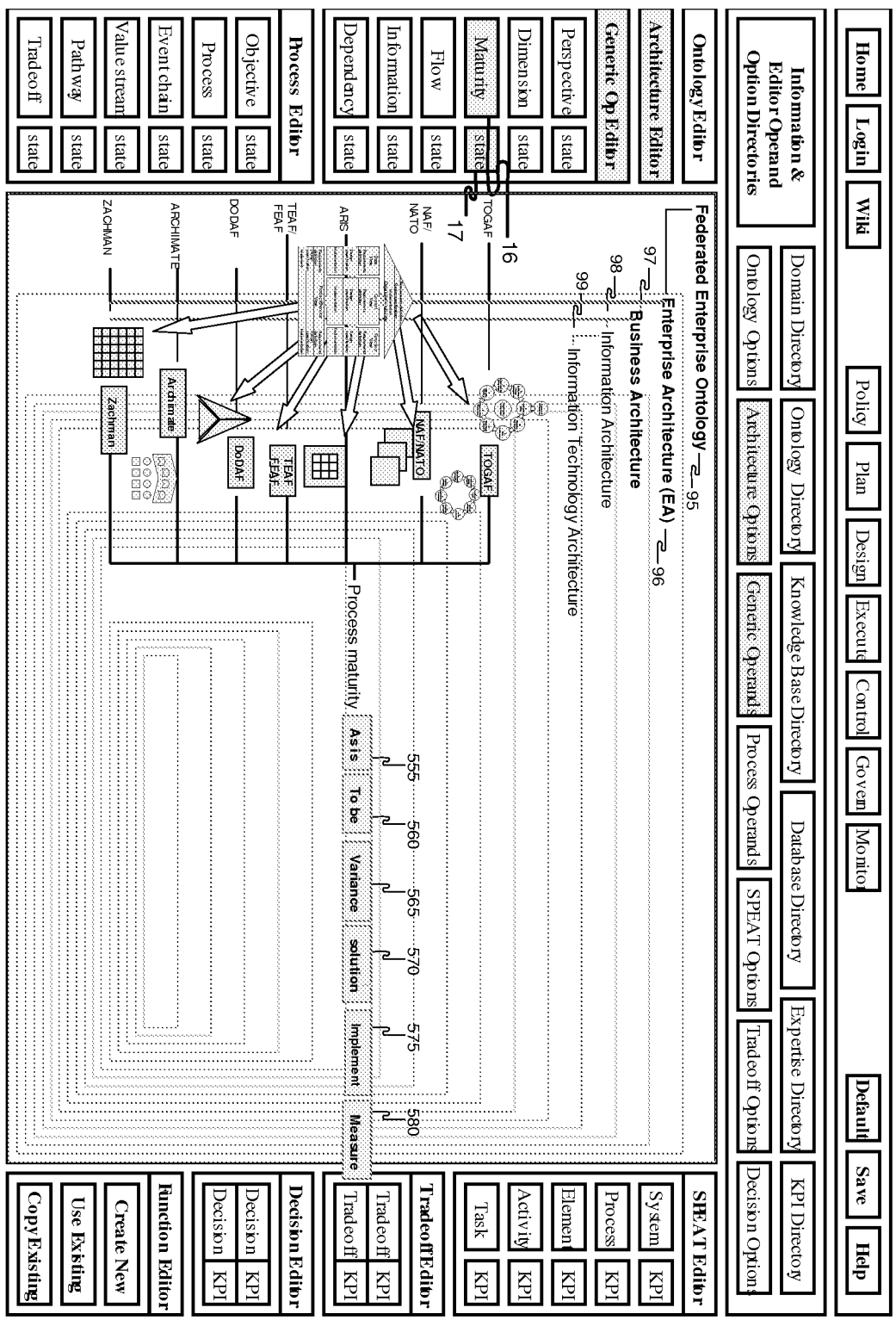

FIG. 15 shows several well used prior art enterprise architecture models all of which may be aligned within the framework including the IDS Sheer 'ARIS house' architecture. These include TOGAF, NAF/NATO, TEAF/FEAF, DODAF, Archimate, Zachman and MDA. FIG. 15 also shows that these architecture models in the prior art all contain the generic process maturity (model) method (but in many forms and different non-standard steps) that may be aligned with the six generic maturity operand state steps in this framework.

Figure 16:
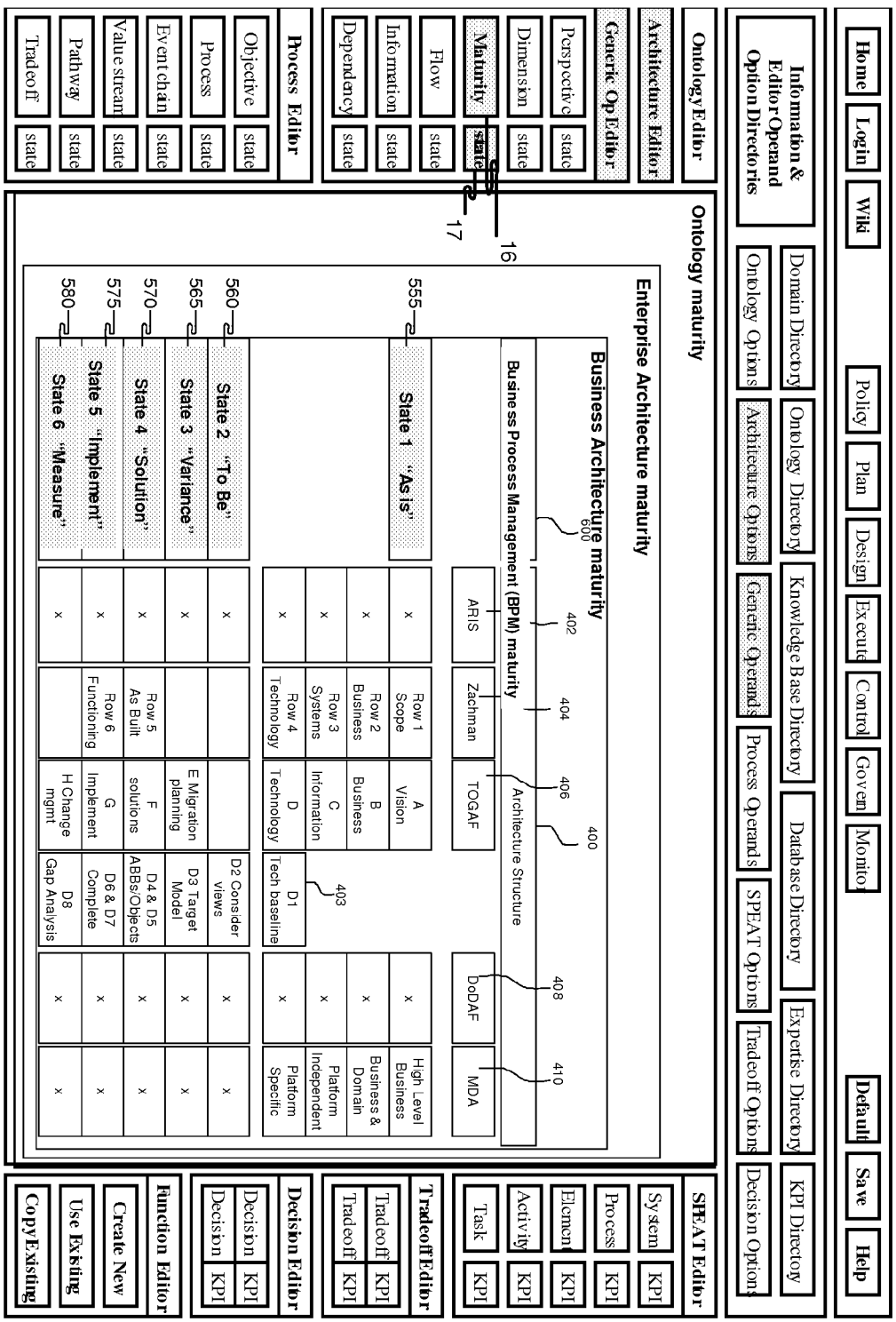

FIG. 16 shows a comparison of these maturity operand state steps for the architectures in FIG. 15 and their common alignment with the six steps in the structure in this invention.

Figure 17:
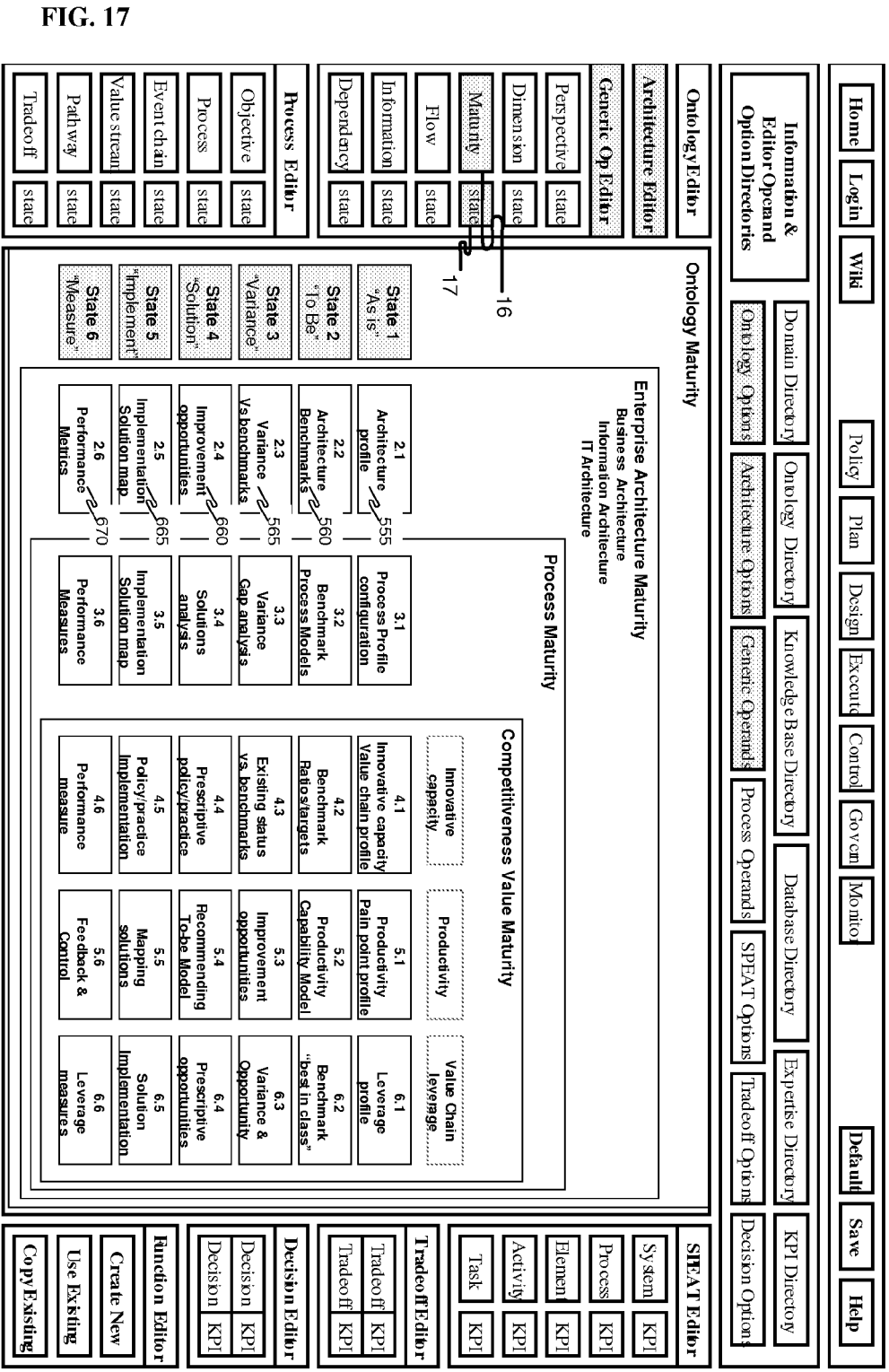

FIG. 17 shows the same maturity operand state step structure in FIGS. 15 and 16 as it may apply generally to all architectures, sub-architectures, processes and process value streams throughout ecosystems.

Figure 18:
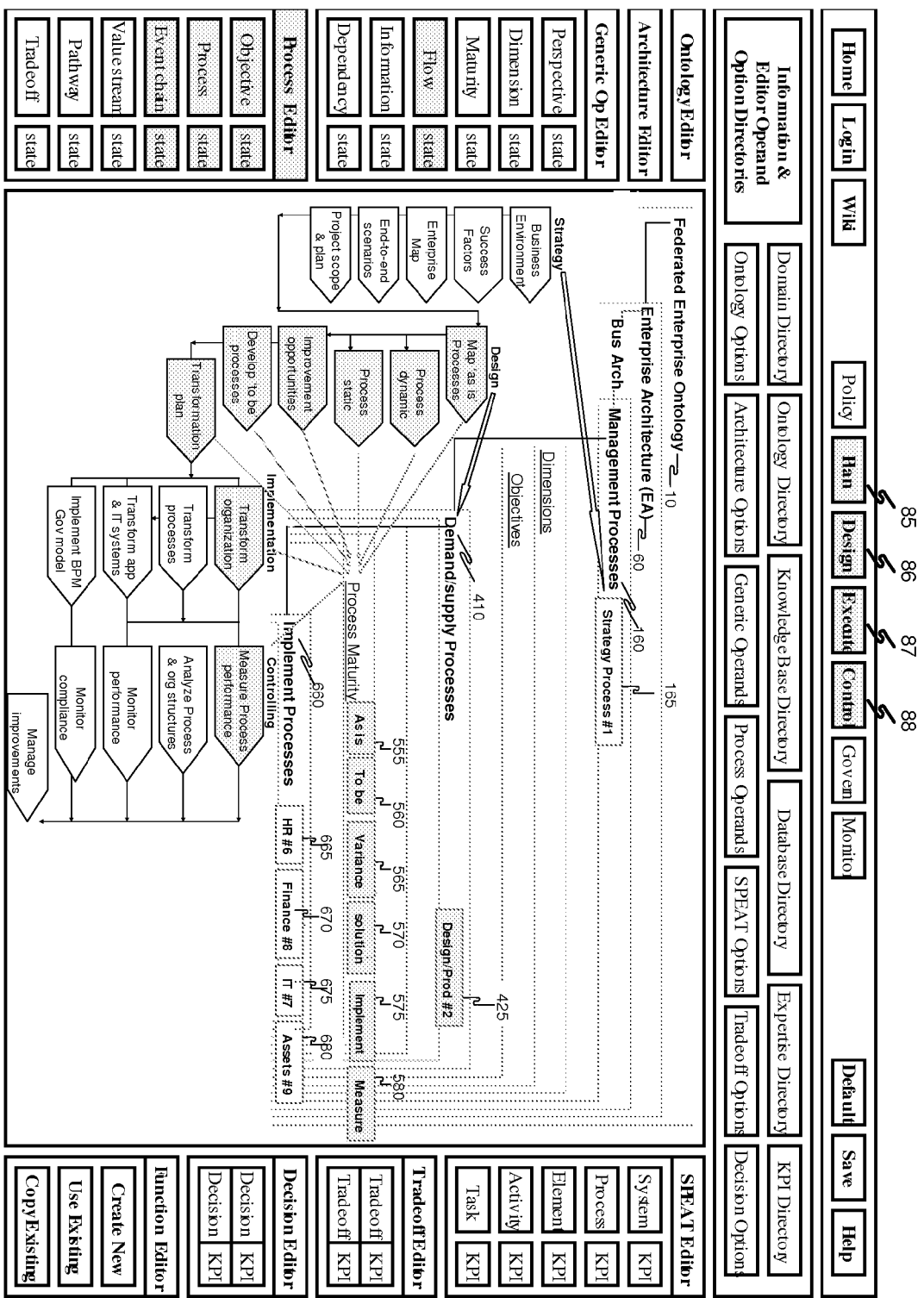

FIG. 18 shows the major flow strategy (defined as a decision 'thread' in this invention) for the IDS Sheer suite of business process management (BPM) modules (including ARIS). This is a supply chain management (SCM) product manufacturing process 'thread' example that links (i) strategy, (ii) design/make products, and (iii) implementation and control processes—human resources (HR) #6, finance #8, Information technology (IT) #7, and assets #9. The overall IDS Scheer software suite therefore aligns with the structure in this invention but it is extremely limited in addressing many of the process operands and their states. The major overall focus of the suite (and the IDS Scheer products) is the maturity operand as shown in FIG. 18.

Figure 19:
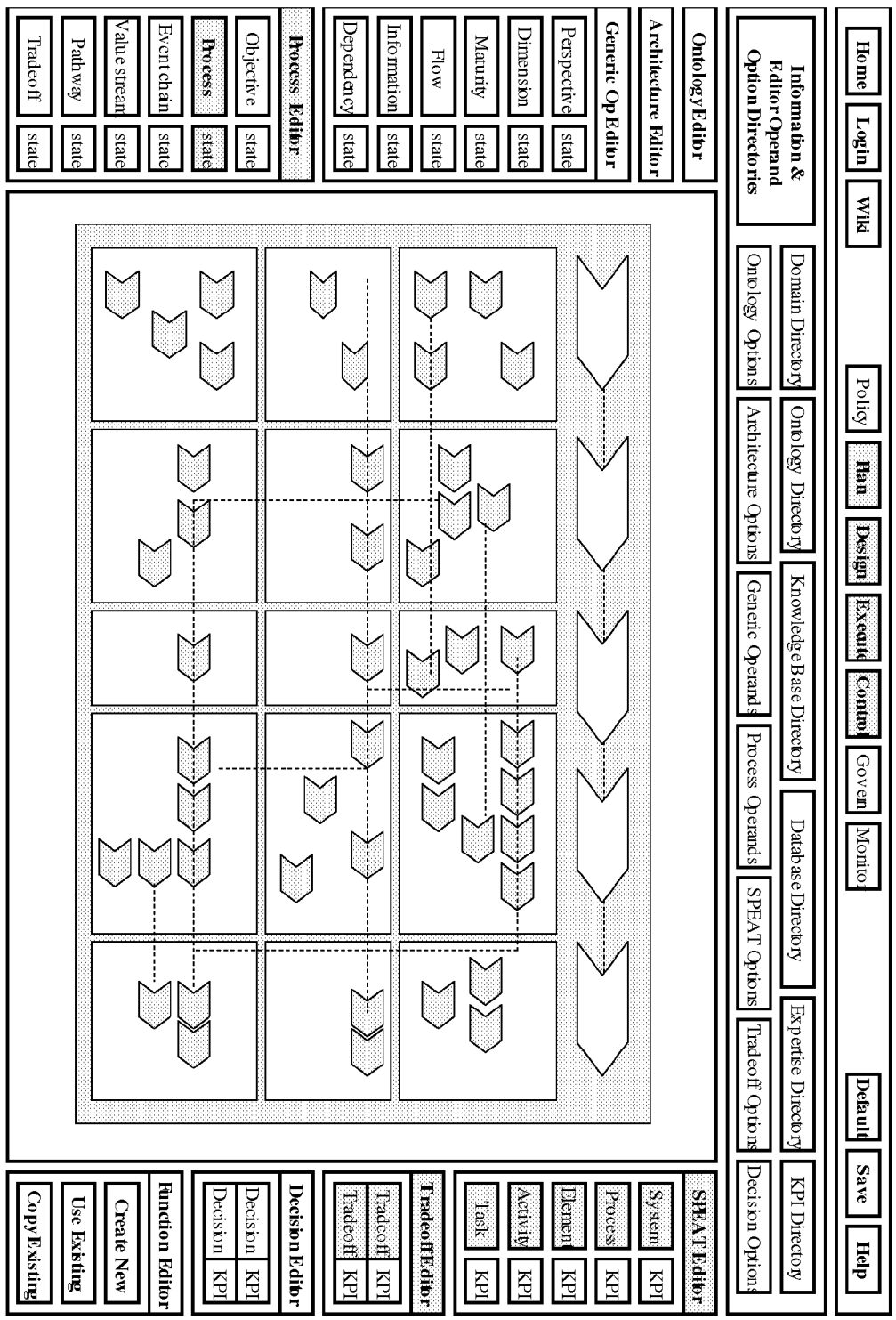

FIG. 19 shows an example of flow linkages or 'threads' in prior art illustrations of supply chains and/or value streams at progressive levels of substructure within a system or process. This type of illustration may be aligned with process operand and SPEAT levels and sub-levels.

Figure 20:
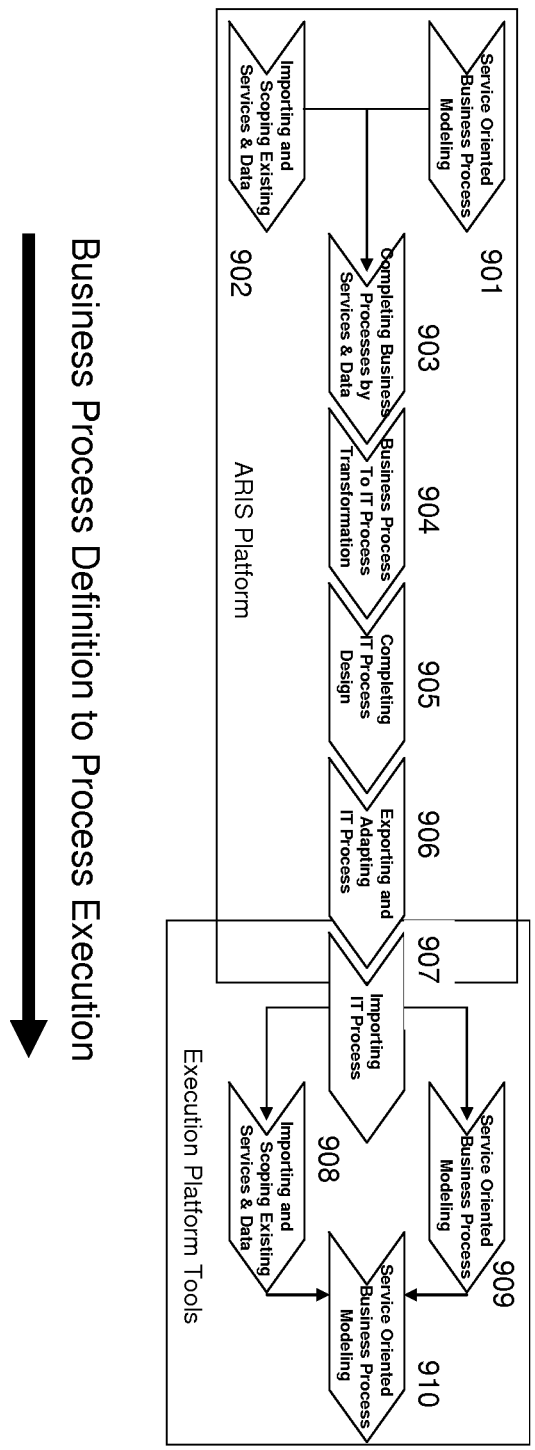

FIG. 20 shows 10 generic steps in the prior art IDS Scheer translation of business process definition to process execution using business process execution language (BPEL). This protocol provides an interface between (abstract) business descriptions of process value streams and their implementation in terms of code by computing scientist information technology architects and programmers.

FIG. 21 shows an example of simple iterative partitions (SIP), for various levels of complexity including factorial 12 operands, and 12 operands each with 1, 4 and 6 states per operand variable as well as examples of partitioned 4 and 6 states per variable.

Figure 22:
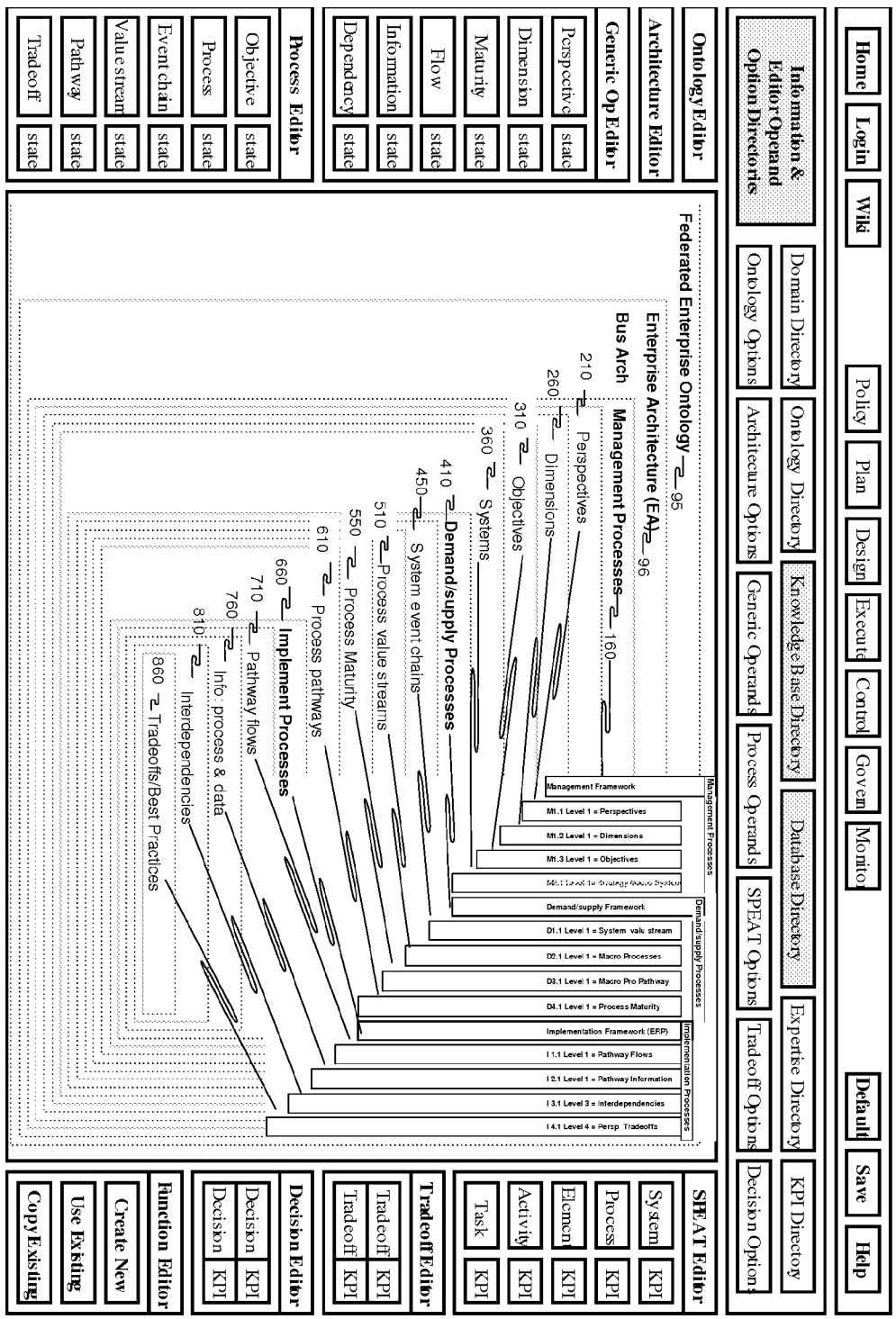

FIG. 22 shows an interactive excel software application that provides an expandable directory for the nested set hierarchy of architecture and process operands.

Figure 23:
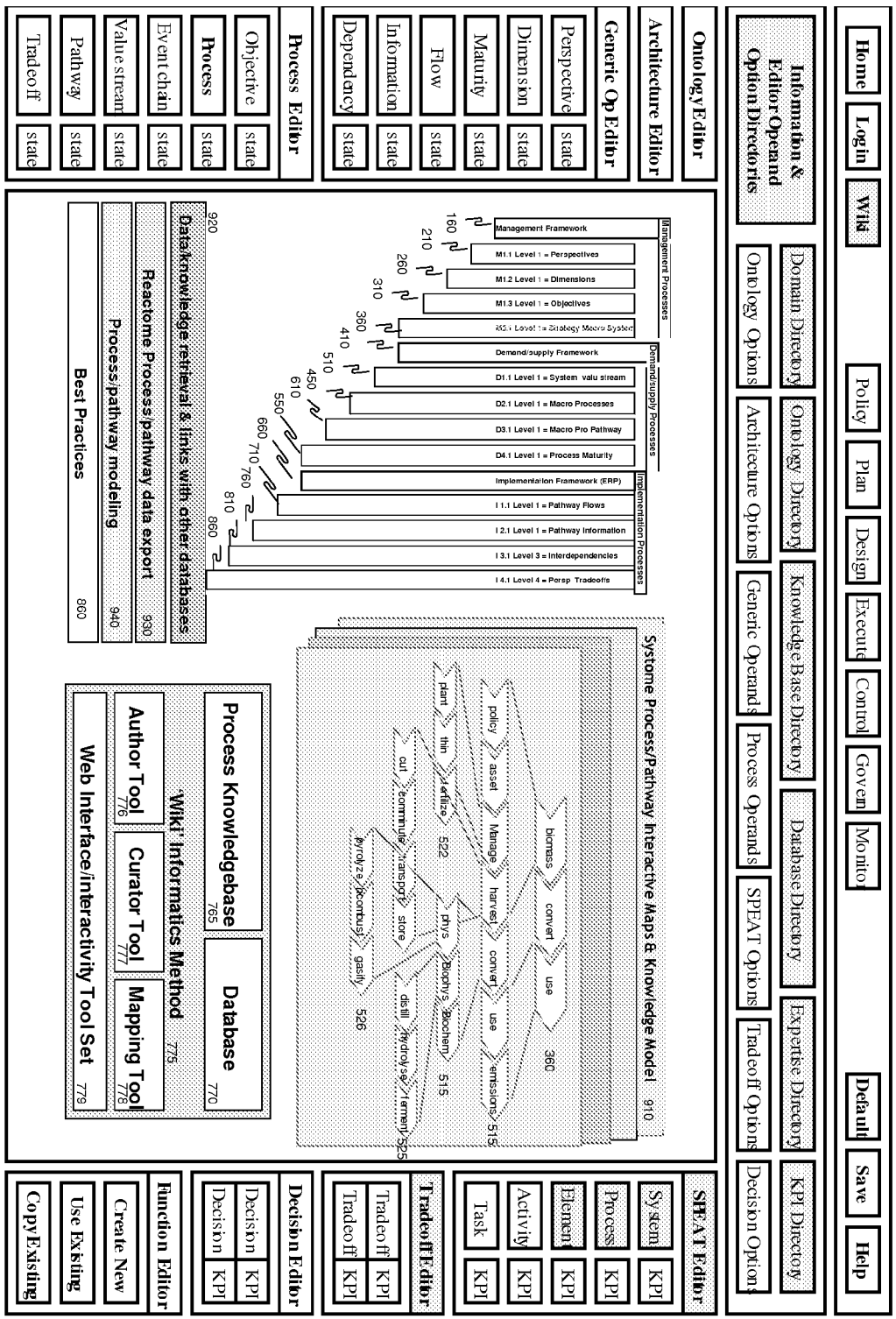

FIG. 23 shows aspects of a knowledge collection and quality assurance 'wiki' method and system for developing ecosystem knowledgebase's utilizing the internet. It shows examples of the components in a 'wiki' informatics method 775 including databases 770, knowledgebase's 765, an authoring tool 776, curator tool 777, mapping tool 778, web interface/interactivity tool set 779, best practices knowledgebase 860, process/pathway modeling 940, reactome process/pathway data export 930, process/pathway modeling tools 940, process/pathway export and links with other data and knowledgebase's 920.

Figure 24:
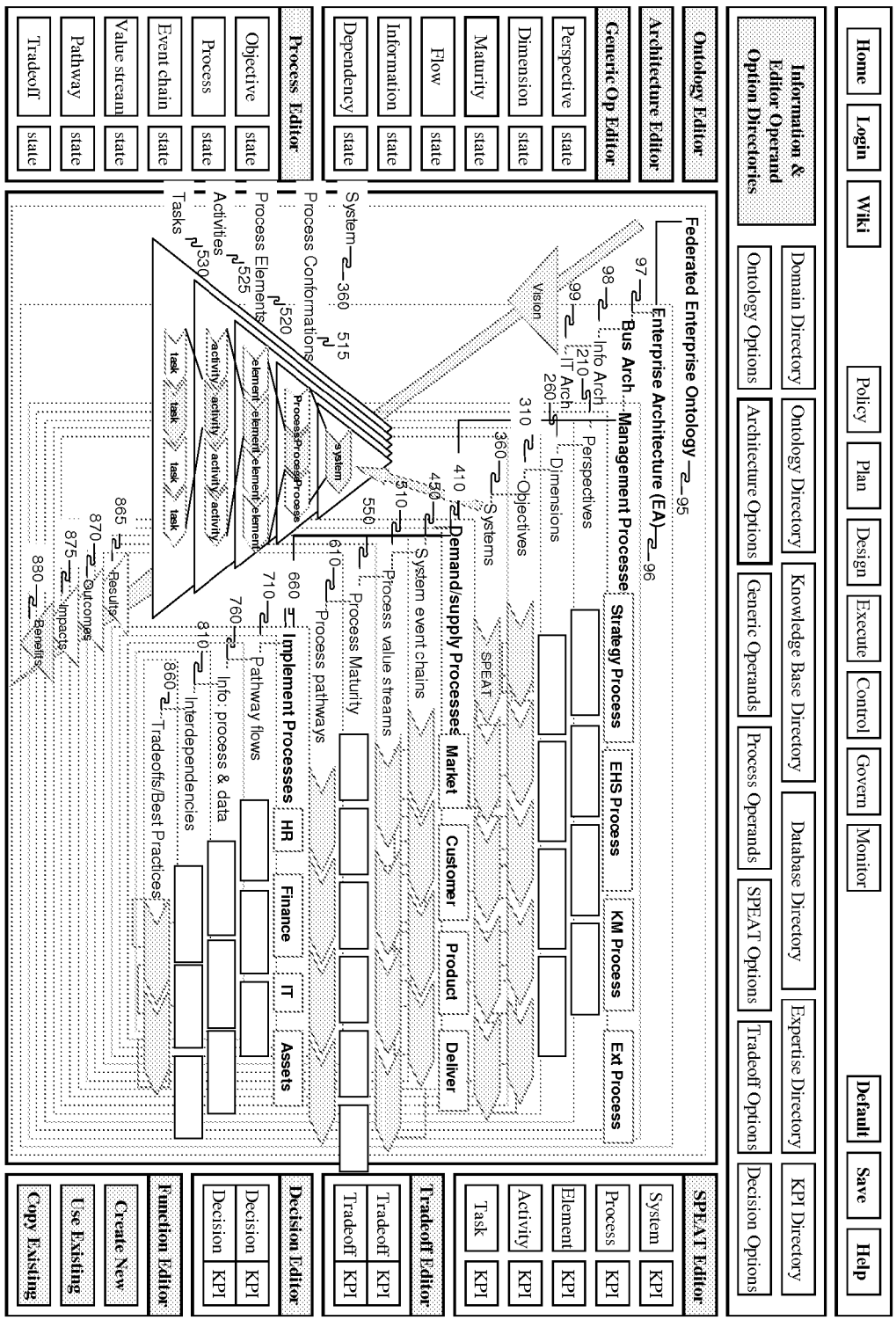

FIG. 24 shows a representation of all of the operand editors for: (a) 'generic' operands, (b) 'process specific' operands, (c) 'SPEAT' process operands, as well as the 'tradeoff', 'decision' and 'function' editors. The figure shows placeholders in the operations window for examples of the operand states which may be recorded and used or modified from the library directories, knowledgebase's and databases, or using 'wiki' methods over the internet. Any permutation of these may be combined to form 'decision' threads and to assess process interdependencies and tradeoffs. The figure shows 'thread' relationships through the nested set hierarchy from 'vision' for operand states and key performance indicators (KPIs) to results, outcomes, impacts and benefits via any of the pathway flow states—workflow/transaction flow, information flow and value flow.

Figure 25:
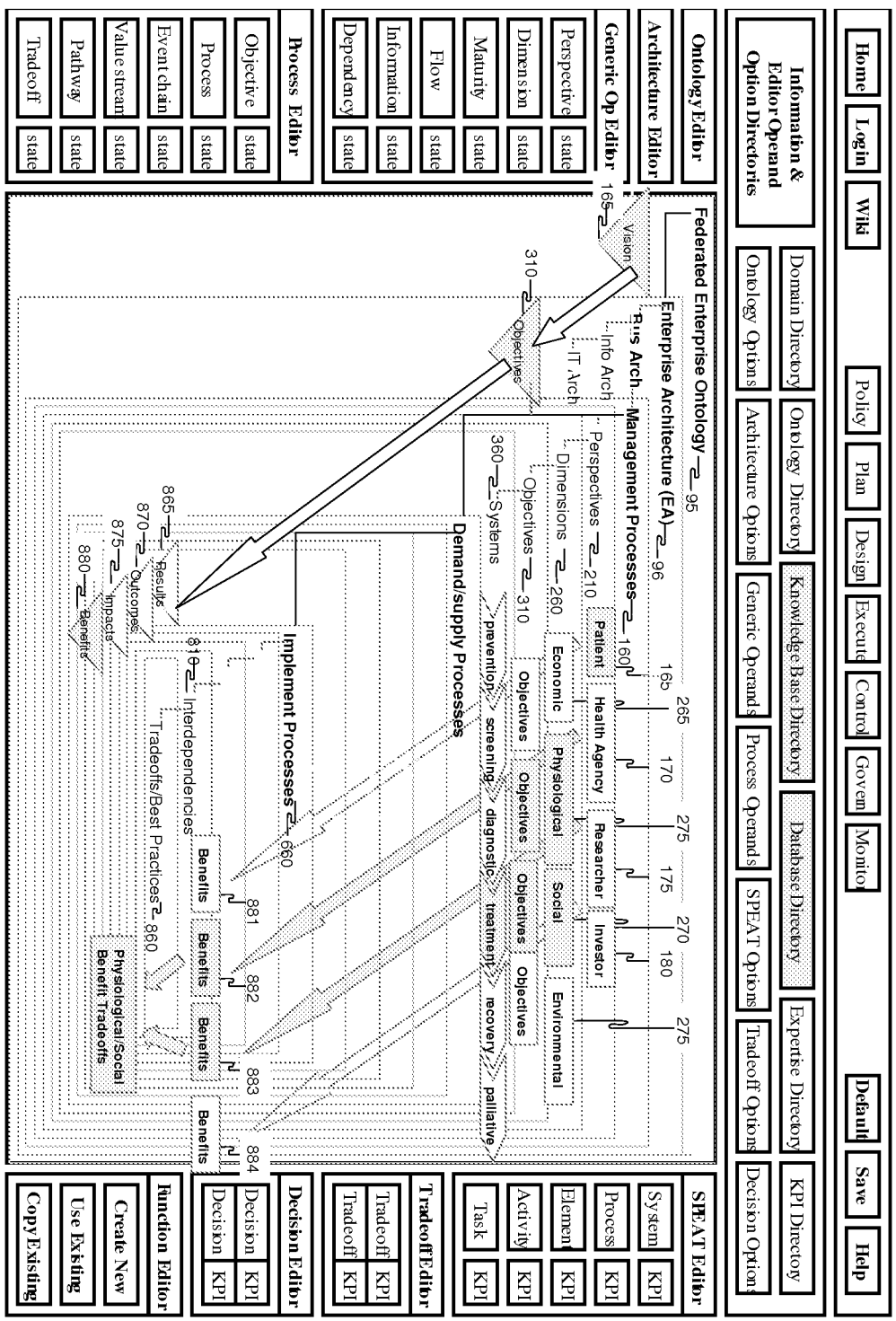

FIG. 25 shows an example 'thread' highlighting one health management process perspective/view operand—the patient—that may invoke operands for dimensions, objectives and systems linking vision to patient benefits. The figure also shows an example of multiple 'thread' operand perspectives for patient, health agency, researcher, and investors and each of their benefits as well as an example for assessing tradeoffs among several sub-sets of these.

Figure 26:
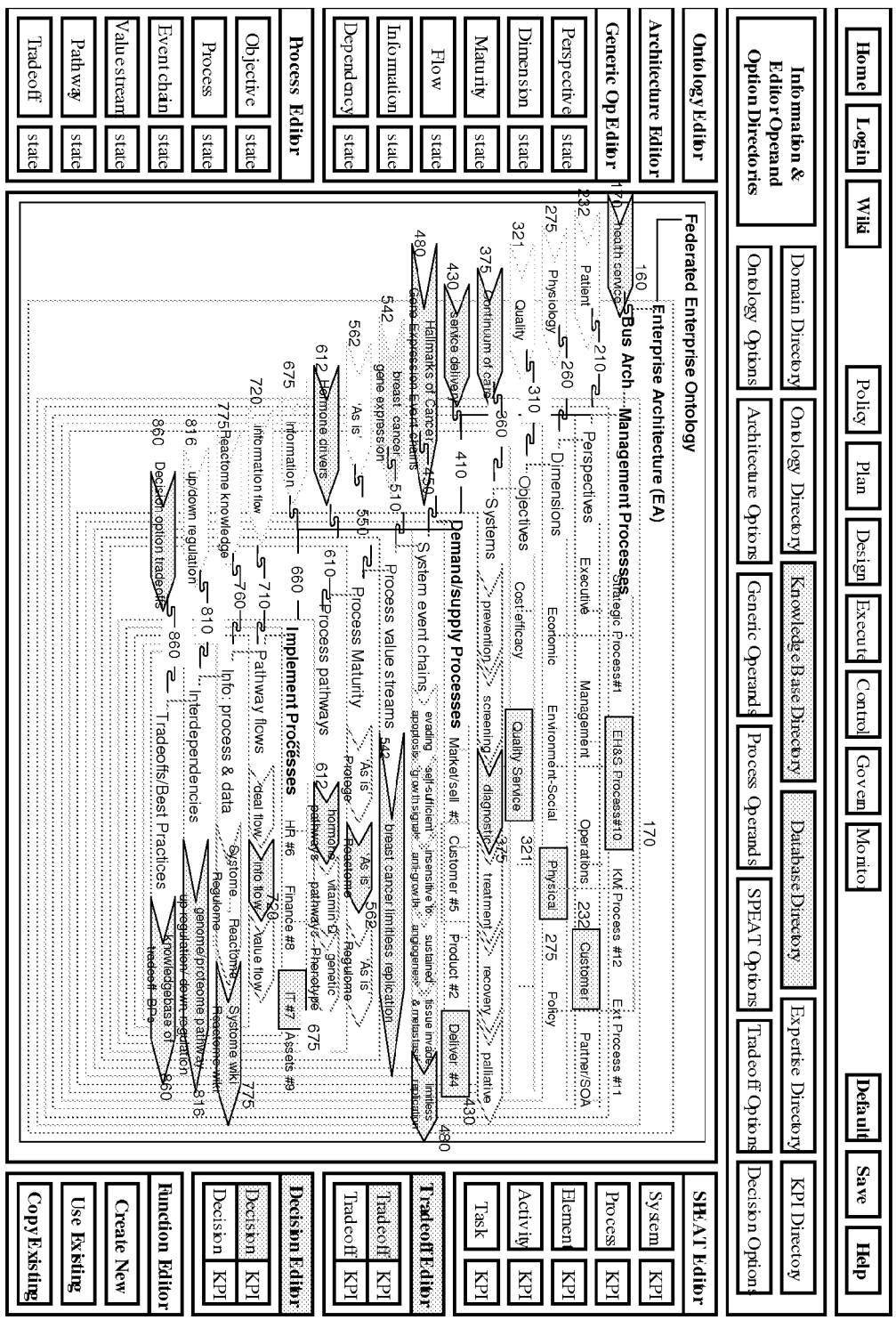

FIG. 26 shows major processes and selected operand states related to the continuum of health care involving prevention, screening, diagnosis, treatment, recovery and palliation. It also shows one of the many 'threads' that may be evaluated from any perspective, dimension, objective and system or process within the health care system.

Figure 27:
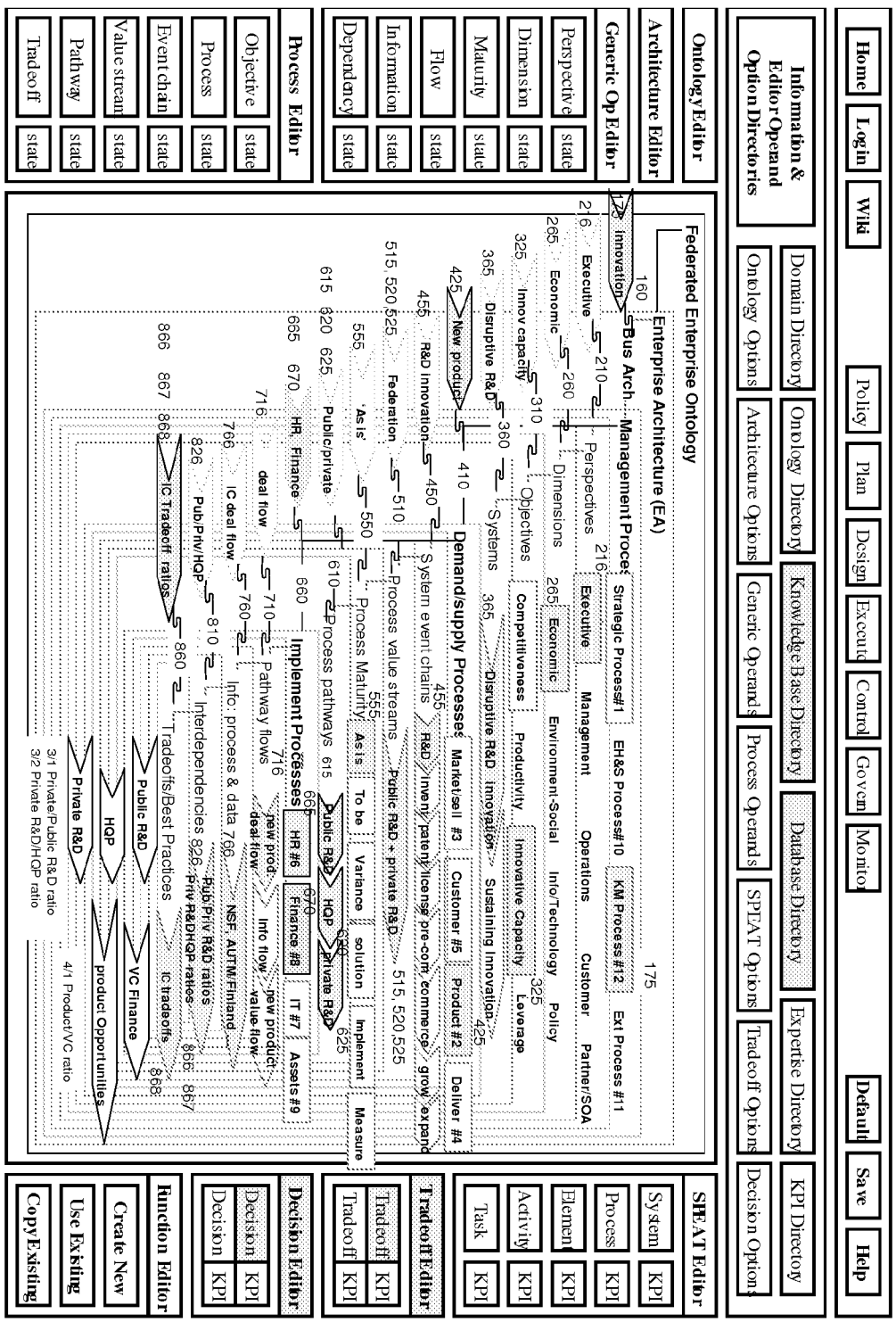

FIG. 27 shows an embodiment for all 12 process attribute operand states for the knowledge management process (APQC Process #12 in the prior art), focusing on innovation research and development (R&D). A 'thread' linking operand states is highlighted for states that are shown in light grey. The selected organization perspective state is executive; the dimension state is economic. Of the objectives operand states—(a) competitiveness, (b) productivity, (c) innovative capacity, and (d) leverage—innovative capacity is highlighted. Of systems operand states (a) disruptive R&D innovation, and (b) sustaining innovation, disruptive R&D is highlighted. The operative demand/supply process is product development. The system event chain selected is the innovation R&D even chain which may be described in terms of 8 states: R&D, invent, proof of concept, prototype, pre-commercial, commercial, grow and expand. The selected value stream operand state is federation Public and Private R&D. The initial maturity state 'as is' is highlighted. Selected key process pathway states (and their interdependencies) are public R&D, high quality people (HQP) and private R&D. These three are selected since they are interdependent. Information states selected are both data and process knowledge. The operative implementation processes selected are human resources and finances. Key process interdependencies are public R&D/private R&D, private R&D/HQP and product opportunities/risk capital. Key tradeoffs are public R&D/private R&D ratios, private R&D/HQP ratios and product opportunities/risk capital ratios. This 'thread' that links these highlighted operand states is also shown in the left portion of the figure while several related key process inter-relationships and tradeoffs are shown together at the bottom of the figure.

Figure 28:
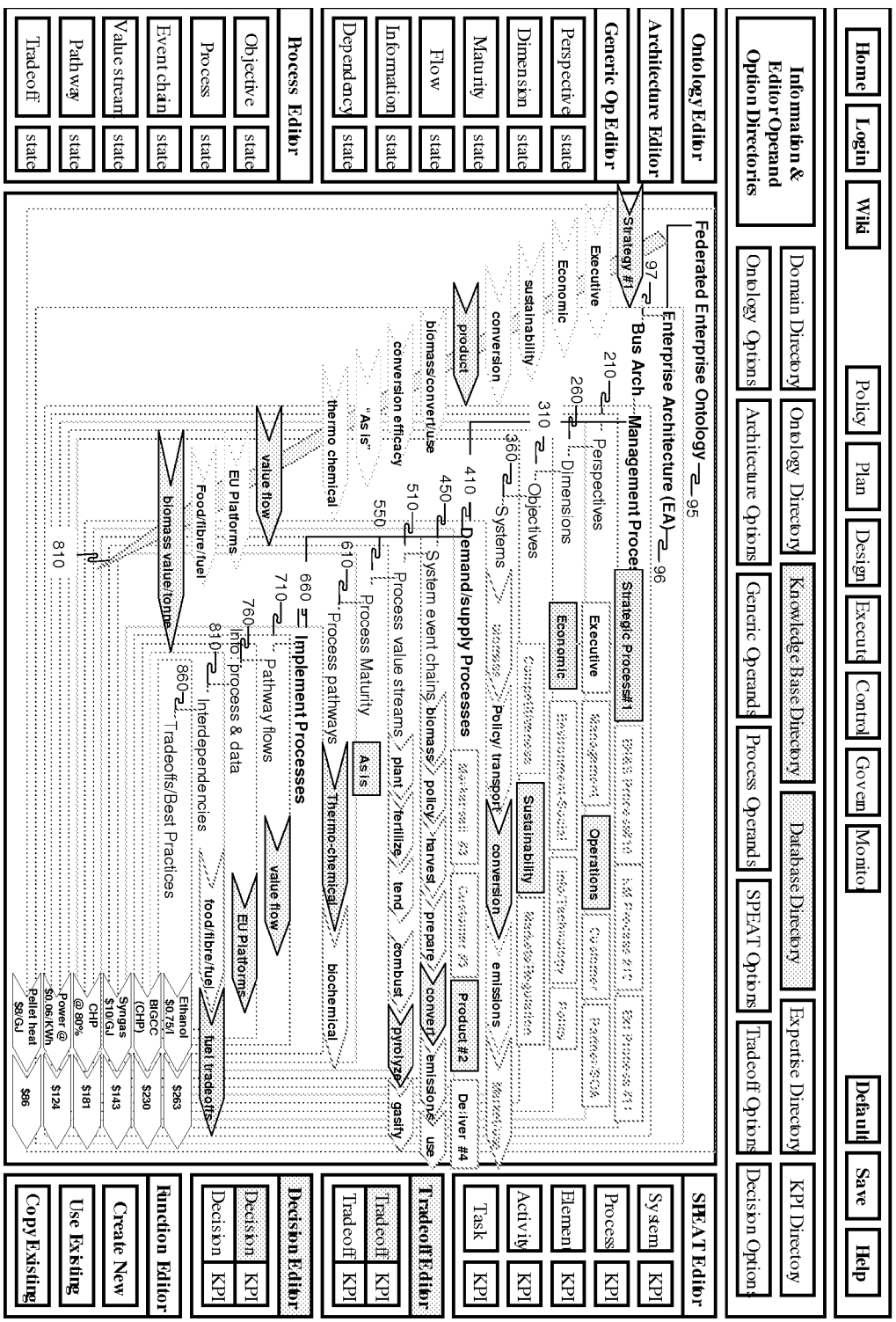

FIG. 28 shows an embodiment with selected operand states that may be used to assess bioenergy ecosystems.

Figure 29:
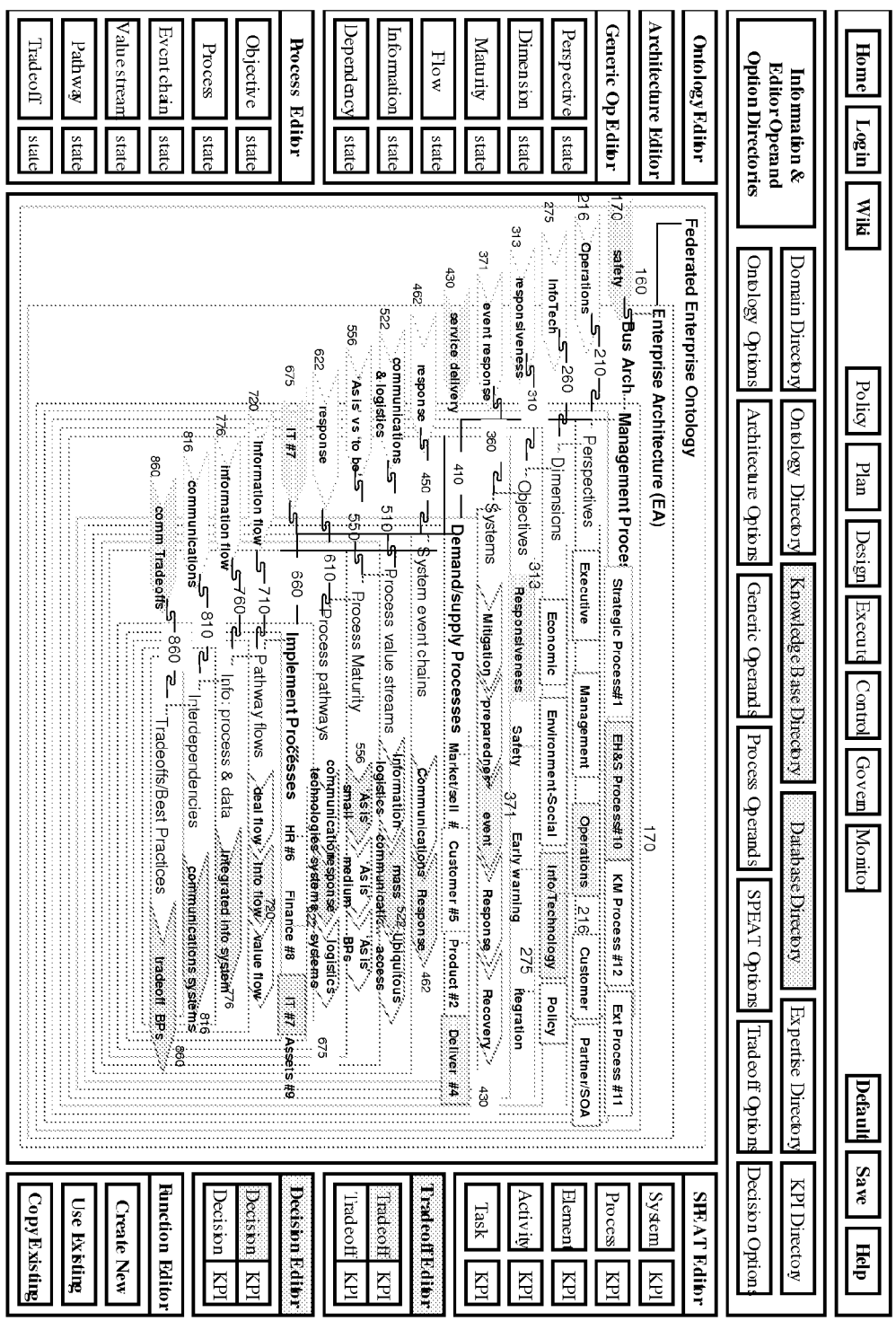

FIG. 29 shows an embodiment with selected operand states that may be used to assess emergency communication systems.

SUMMARY OF THE INVENTION

This invention incorporates by reference herein U.S. Provisional Patent Applications 60/774,597 Feb. 21, 2006, 11/676,305 Feb. 18, 2007, U.S. patent application Ser. No. 12/344,350 and Provisional Application 61/164,779 Mar. 30, 2009 by Cornford. It also extends these existing patent applications by providing a unique generic framework, system, method and device for optimizing enterprise ecosystem value by providing a means for assessing process interdependencies and tradeoffs.

1. A Common Framework 'Nested Set' Hierarchy Structure

While this invention applies to all types of ecosystems in all domains, a majority of example embodiments focus primarily towards enterprise ecosystems and business processes and prior art related to these for reference. The concepts, system and method defined in specific detail in this invention have general broad scope and that coverage is included in this invention beyond specific embodiments and examples specifically described.

There is no standard or generic ecosystem framework or common ontology in the prior art that incorporates or unifies most major enterprise architecture (EA) models, process operations reference models (ORM) and maturity models (MM). This invention resolves this deficiency by providing a generic, common 'nested set' framework structure, system, method and device applicable to all kinds of ecosystems.

Figure 1:
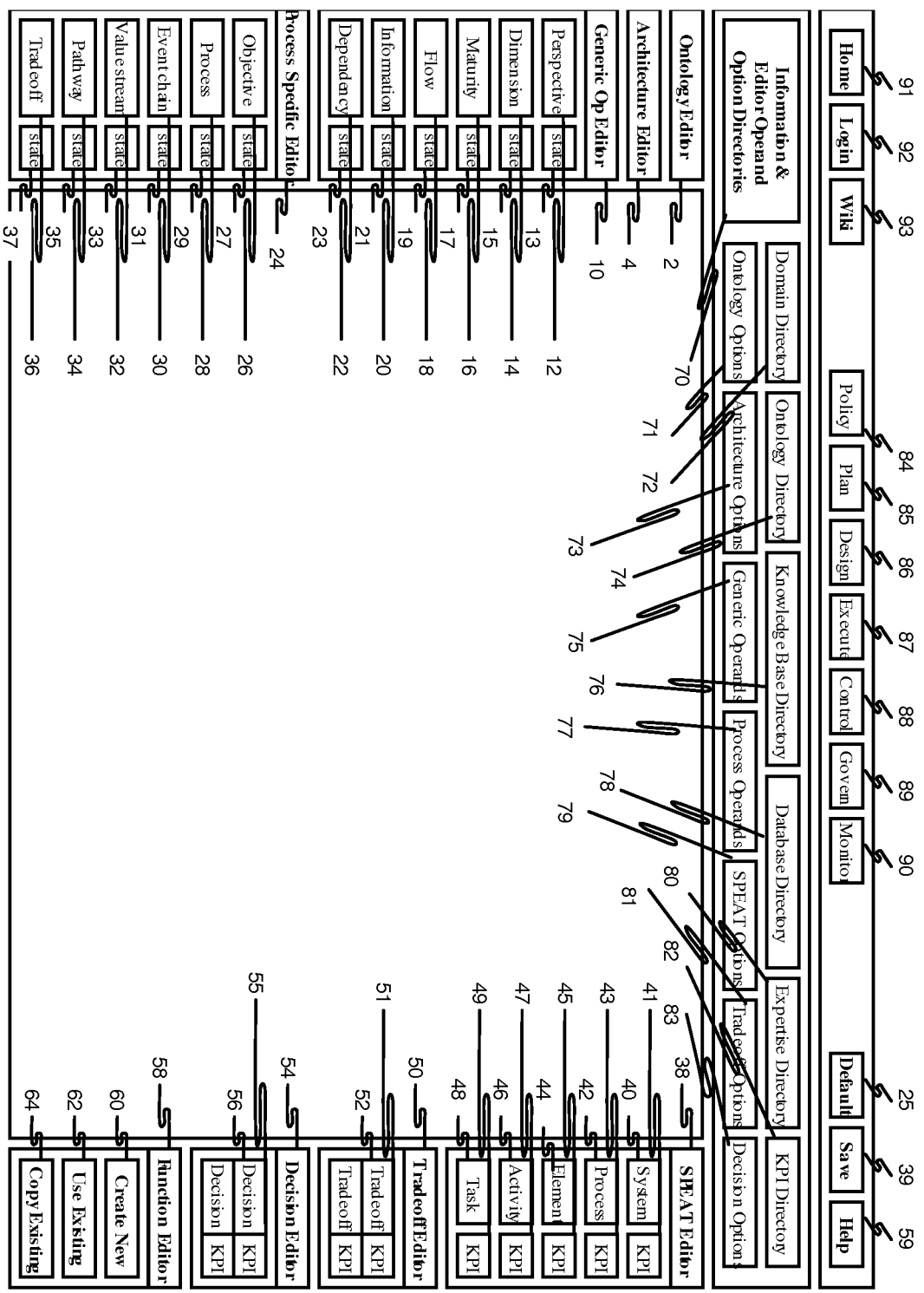
FIG. 1 shows navigation and edit functions within the software dashboard editor console. The top bar displays general application functions as well as categories of business enterprise operations. The second bar holds a suite of links to internal system information and editor operand directories as well as links to external internet and 'wiki' knowledge bases and databases. At both sides of the main window, there are suites of editor buttons for: ontology, architecture, and process operands on the left side and process levels (SPEAT—system, process, element, activity and task), tradeoff and decision operand editors to the right. At the lower right side there is a function editor for creating, using, copying or transforming any content, article or object from knowledge/data bases, directories or active windows accessible to the graphical user interface (GUI) dash board. These editors all may designate and/or transform an article from one state to another article, object or state (as referred to in rulings regarding patentable subject matter in Bilski).

The general features and functions for the device dashboard console that facilitates description, edit, use, and assessment of complex ecosystems is shown in FIG. 1. The top bar displays general application functions as well as categories of business enterprise operations: policy 84, plan 85, design 86, execute 87, control 88, govern 89 and monitor 90. The second bar holds a suite of links to internal system information and editor operand directories 70 as well as links to external internet and 'wiki' 93 knowledge bases 76 and databases 78. At both sides of the main window, there are suites of editor buttons for: ontology 2, architecture 4, generic process operands 10 and process specific operands 24 on the left side and process levels 38 (SPEAT—system, process, element, activity and task), tradeoff 50 and decision operand 54 editors to the right. At the lower right side there is a function editor 58 for creating 60, using 62, copying 64 or transforming any content, article or object from knowledge/data bases, directories or active windows accessible to the graphical user interface (GUI) dash board.

Figure 2:
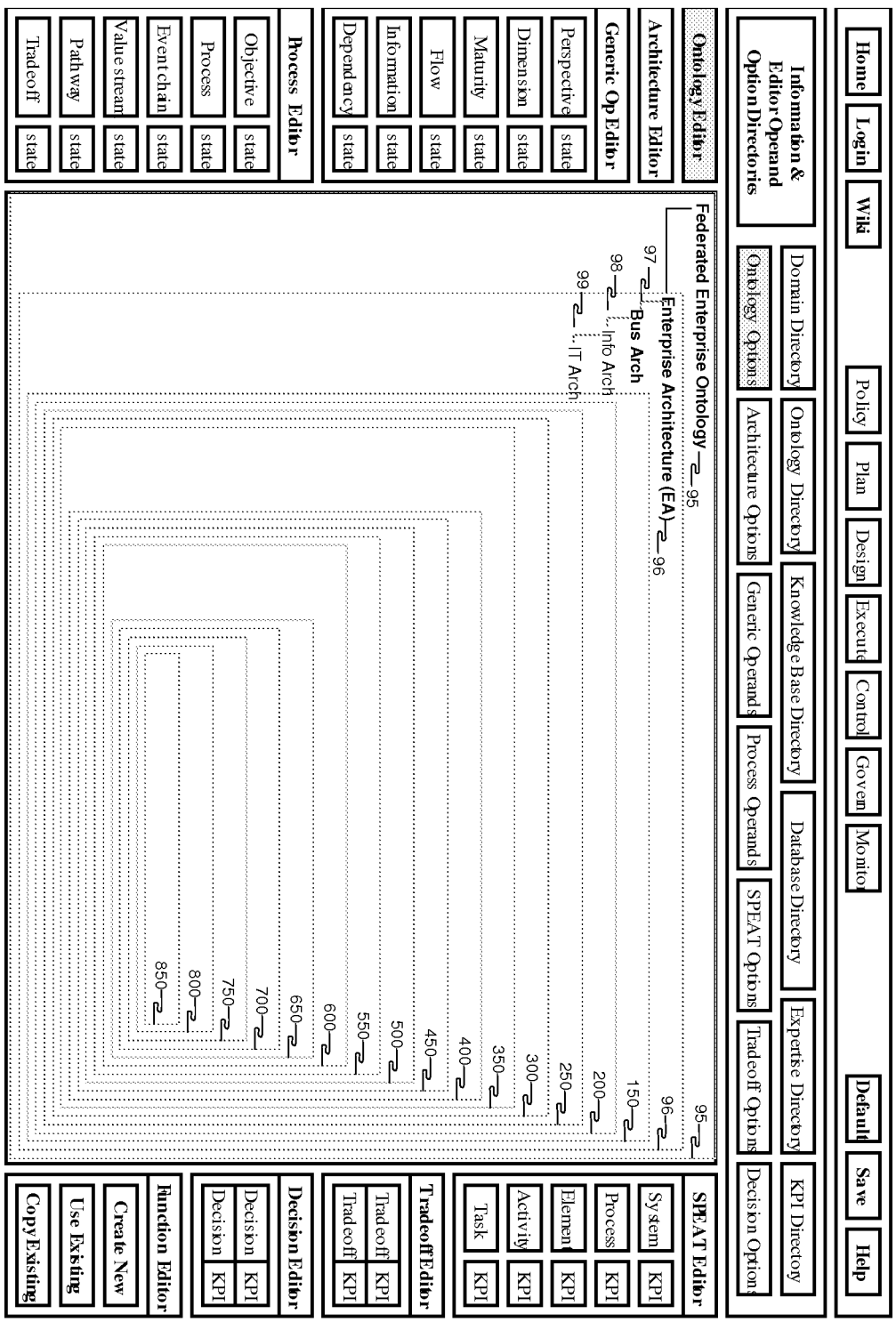
FIG. 2 shows a layered 'nested set' framework architecture in the active software device window, where each subsequent interior set in the structure is a sub-set within the last. This structure may be described as a hierarchy of 'nested sets' beginning with a generic ontology within which there are enterprise architecture subsets, system architecture subsets, process architecture subsets, and process component architecture subsets. The first few of these is shown in the upper left corner and the nested sets are enumerated to the right side of the window from 95 to 850. The suite of editors may operate on any ecosystem component at any and all levels of aggregation or disaggregation—federations, systems, processes and process sub-components—for all types of management, physical, chemical and biological systems.
Figure 3:
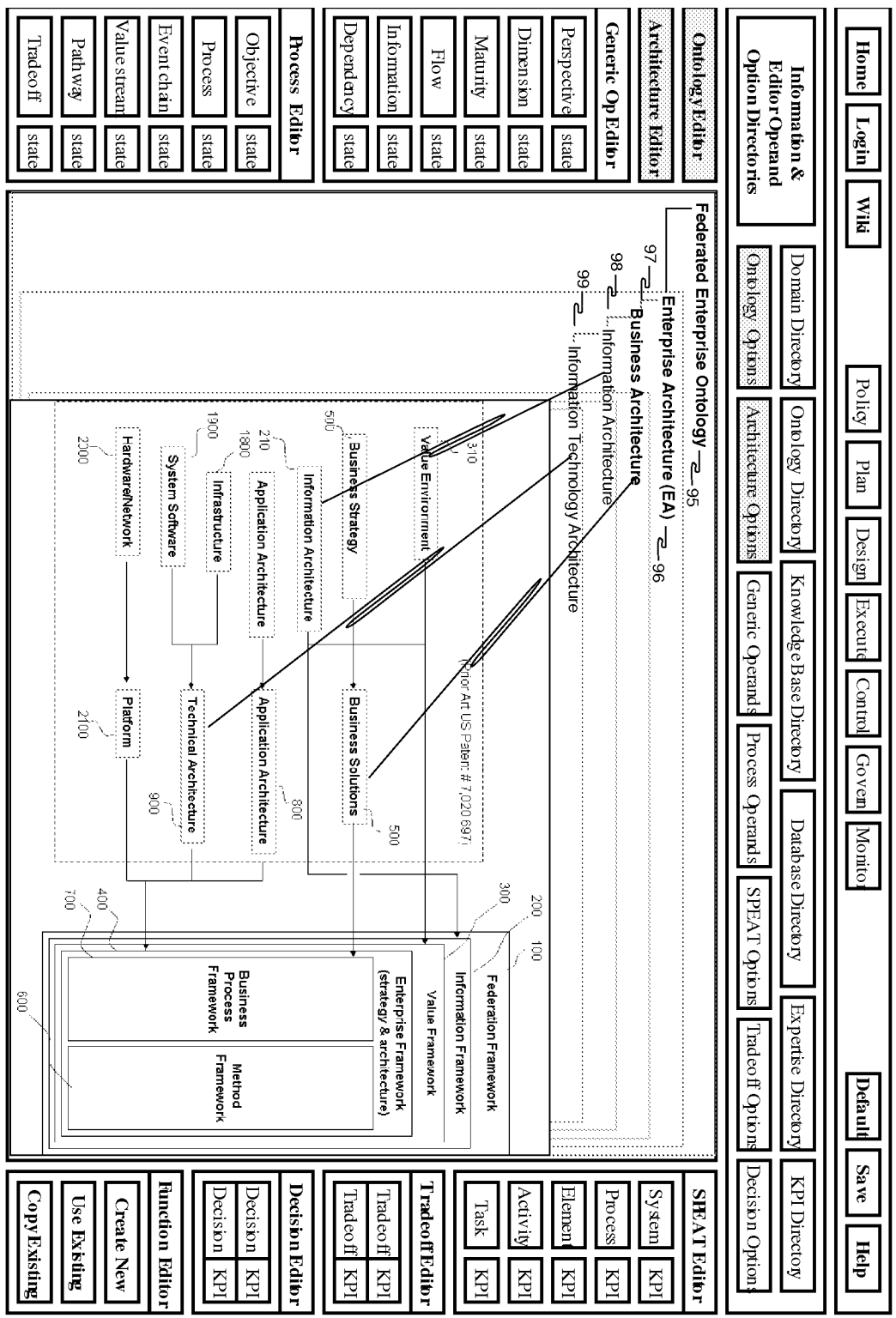
FIG. 3 shows an example of enterprise hierarchy substructure including: (i) business process architecture, (ii) information architecture, and (iii) IT architecture and alignment of these architecture components with similar aspects of enterprise architecture in the prior art in U.S. patent application Ser. No. 12/344,350 (shown in its FIG. 4).

The generic framework in this invention is shown in the console window in FIG. 2. This embodiment comprises 17 nested sets, one within the next. The first set is the ontology 95, within which there is architecture 96, within which there are ontology, architecture, process and process operands nests sets 150-850.

This common hierarchical structure may be applied to all levels of ecosystem architecture and process aggregation or disaggregation however the prior art lacks consistency in ontology which remains an impediment to adoption of a standard representation. Convergence towards common ontology is shown in FIG. 12 with enterprise and biological ecosystem nomenclature aligned. A generic ontology is adopted and used in this invention having universal applicability.

Figure 4:
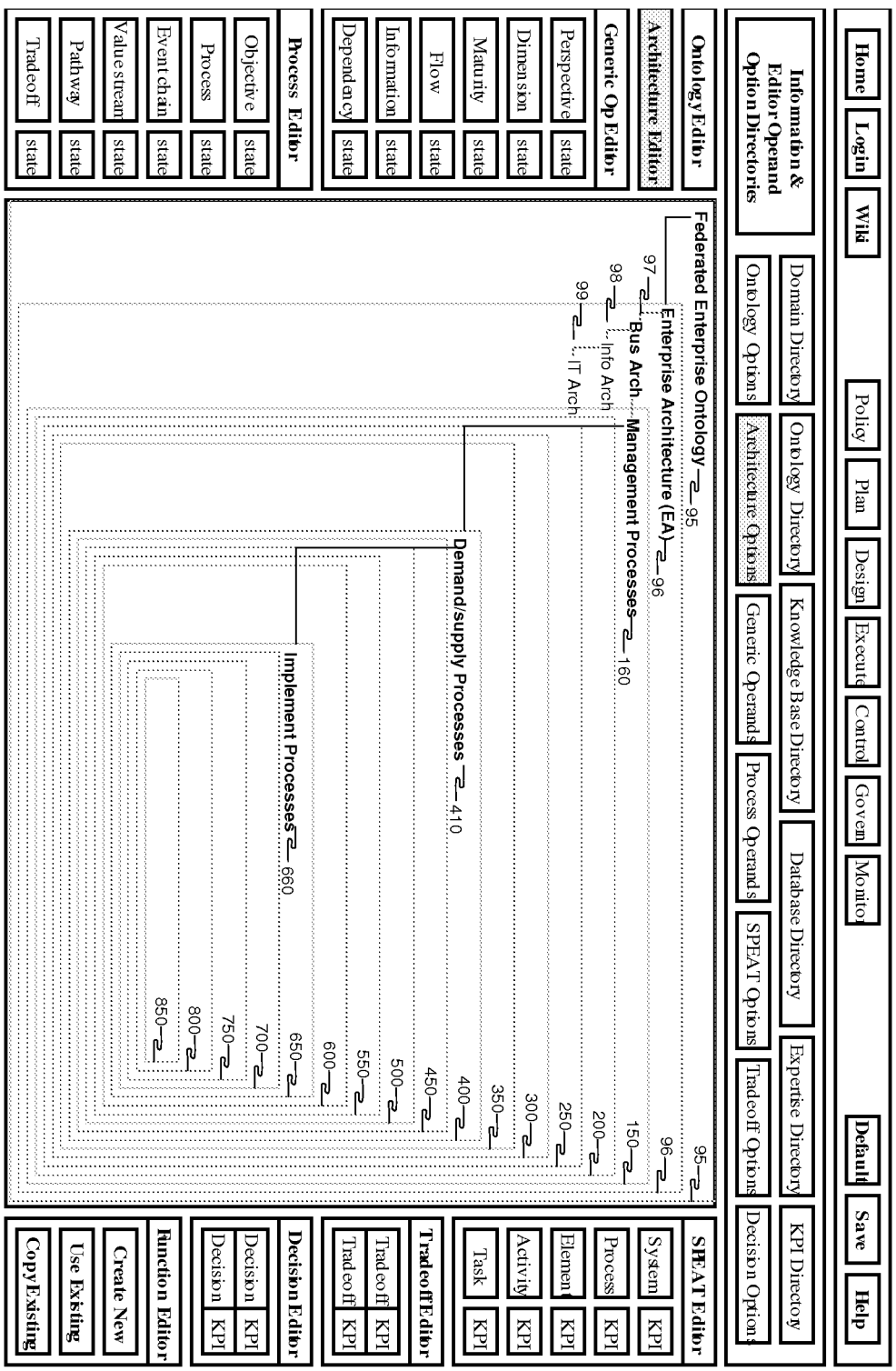
FIG. 4 shows the business (process) architecture subset of the enterprise architecture (EA) and its three major operands—(a) management processes, (b) demand/supply ('core') processes within these and (c) implementation (support) processes within these.

Processes convert inputs to outputs. They are a fundamental foundation for the framework which may be described as 'process centric'. Within enterprise architecture 96, process structure 97 is based on a nested set of three major types of architecture operand process categories shown in FIG. 4. Management processes 160 set the context for demand/supply processes 410 which are executed by implementation/support processes 660. Linkage among these types of processes provides 'business agility' aligning business strategy with IT (information technology) execution and vice versa.

Much of the complexity in representing ecosystems in the prior art results from a combination of (i) lack of common process ontology, (ii) the myriad of potential process attributes (operands) and their states, and (iii) lack of a generic accepted structure for their transparent and ordered representation. For example, 12 process operands, each with 6 states, provide up to 2.6 billion options that may be highly intertwined and interrelated. This invention not only provides for standard definitions, standard structure and transparency among these options, but also provides a means of focusing towards a few combinations among them 'that matter most' for optimizing ecosystem functioning.

2. Generic Process Operands and States

Figure 6:
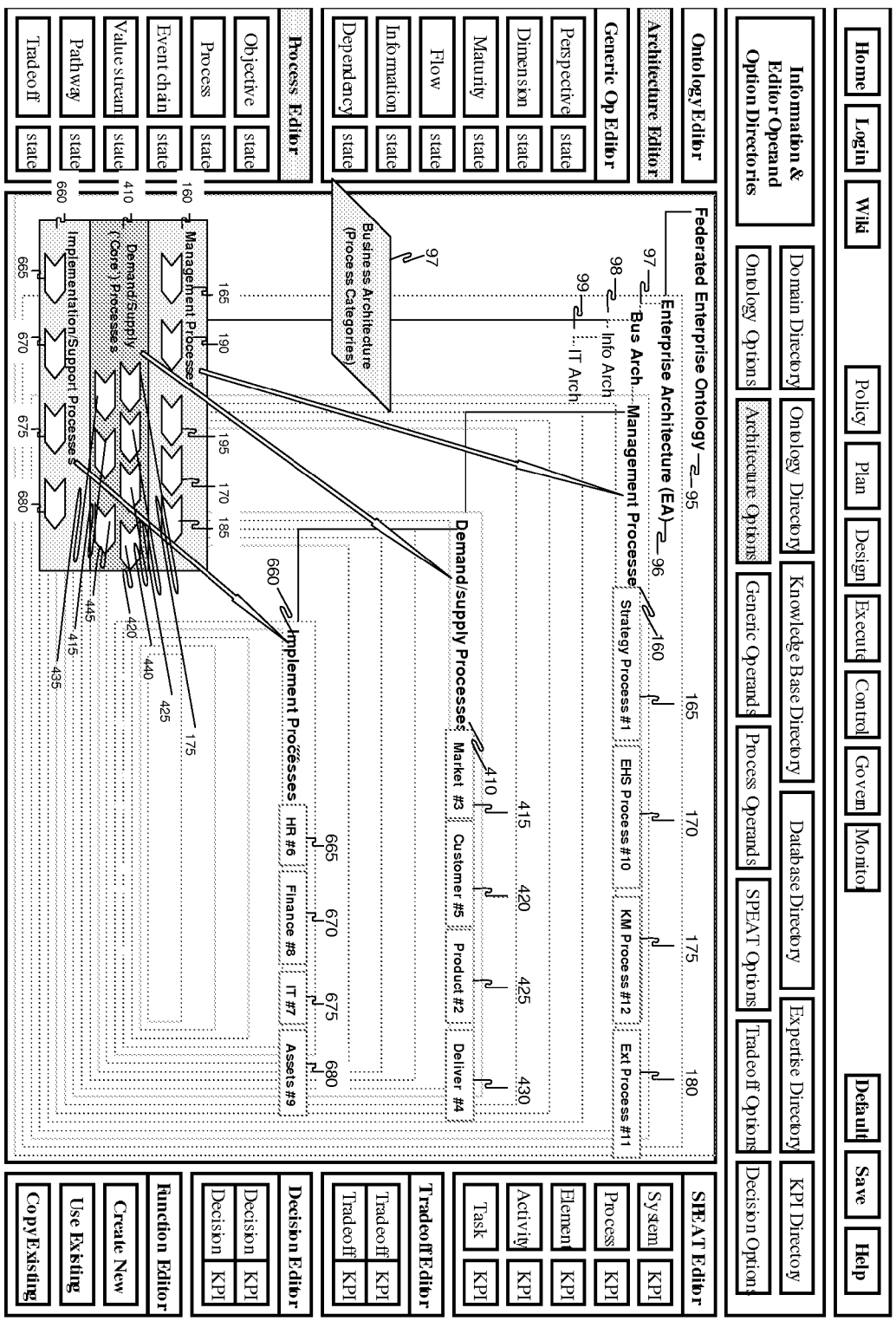
FIG. 6 shows these same 12 business process architecture operand states as they also partially align with process designations of IDS Scheer for an automotive manufacturer embodiment. However the IDS Scheer definitions differ from APQC definitions in FIGS. 5 and 6. There is a need for their standardization for SOA as well as for SaaS. This invention provides a generic framework basis (closer to that of APQC) for standardization that is presently lacking in the prior art for common process definitions.

The invention defines a common nested set structure within which generic process operands and operand states may be defined and applied for all processes in all ecosystems. A preferred 'nested set' order of operands is shown in the embodiment in FIG. 7. This order begins with the architecture process operand hierarchy in FIG. 4 and described above. There is some evidence of this type of representation in the prior art of IDS Scheer and Gartner as shown in FIG. 6 but it is rare, unconnected to overall architecture structure and there is no consistency in what is included or in nomenclature.

In this invention, there are 4 process operand states for each architecture operand. Each of these major process category operands has 4 process states shown in FIG. 5 with nomenclature defined in the APQC Process Classification Framework shown in the lower left corner of the figure. However as shown in this APQC nomenclature is not the same as that utilized by IDS Sheer in FIG. 6 and FIG. 18 and others in the prior art. This lack of standardization inhibits interoperability, and service-oriented architecture (SOA) implementation.

Figure 5:
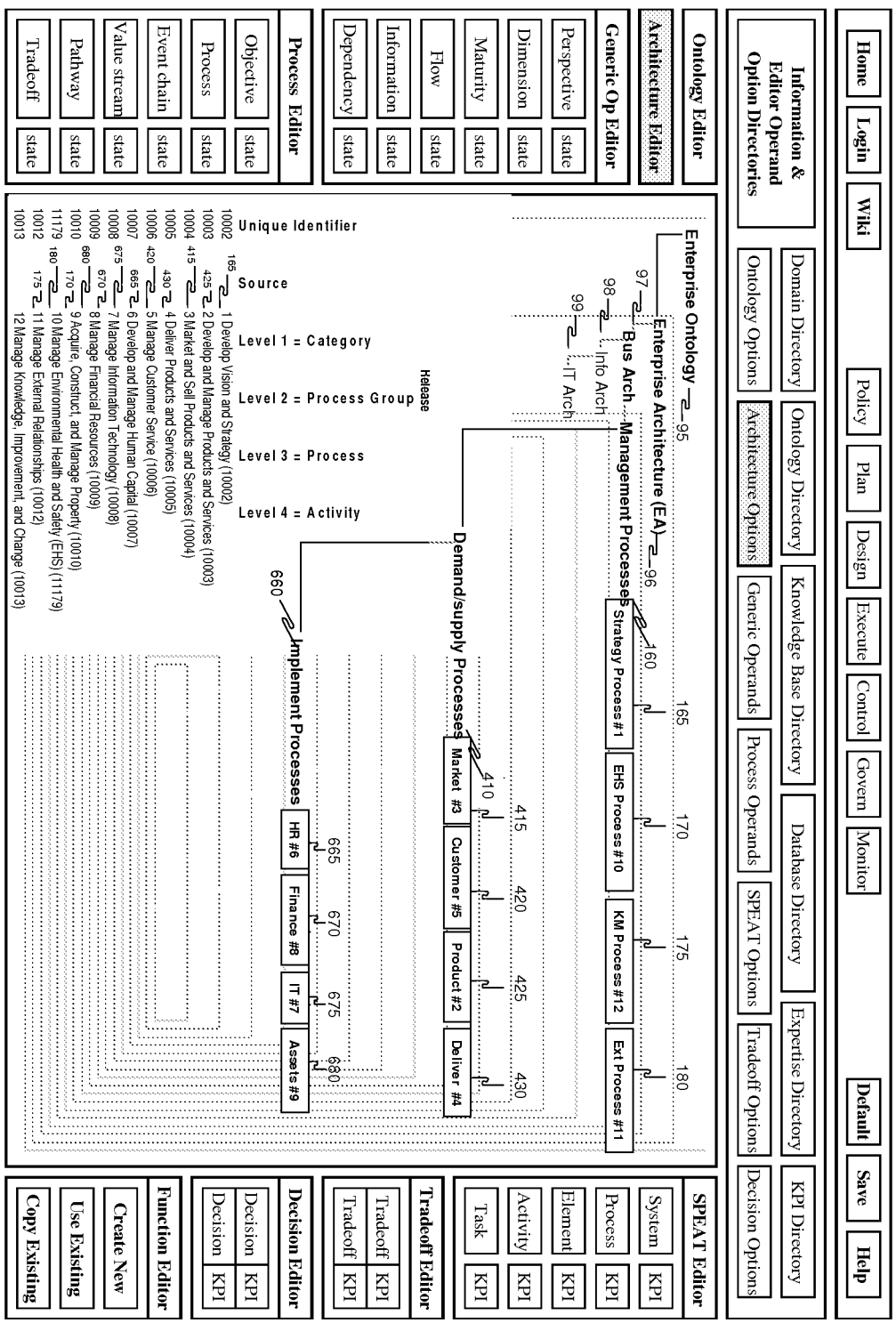
FIG. 5 shows the three major (business process architecture) operand states—which may also be defined as the 12 major business processes in the enterprise—aligned with prior art APQC Process Classification Framework nomenclature shown in the lower left portion of the figure. Four (4) management process operand states are: strategy #1,environment/health and safety #10,knowledge management #12,and external relations #11; four (4) demand/supply (core) process operand states are—marketing and sales #3,customer relations #5,product/service design and development #2,delivery #4; and four (4) implementation (support) process operand states are—human resources #6,finance resources #8,information technology resources #7,and other asset resources #9.
Figure 7:
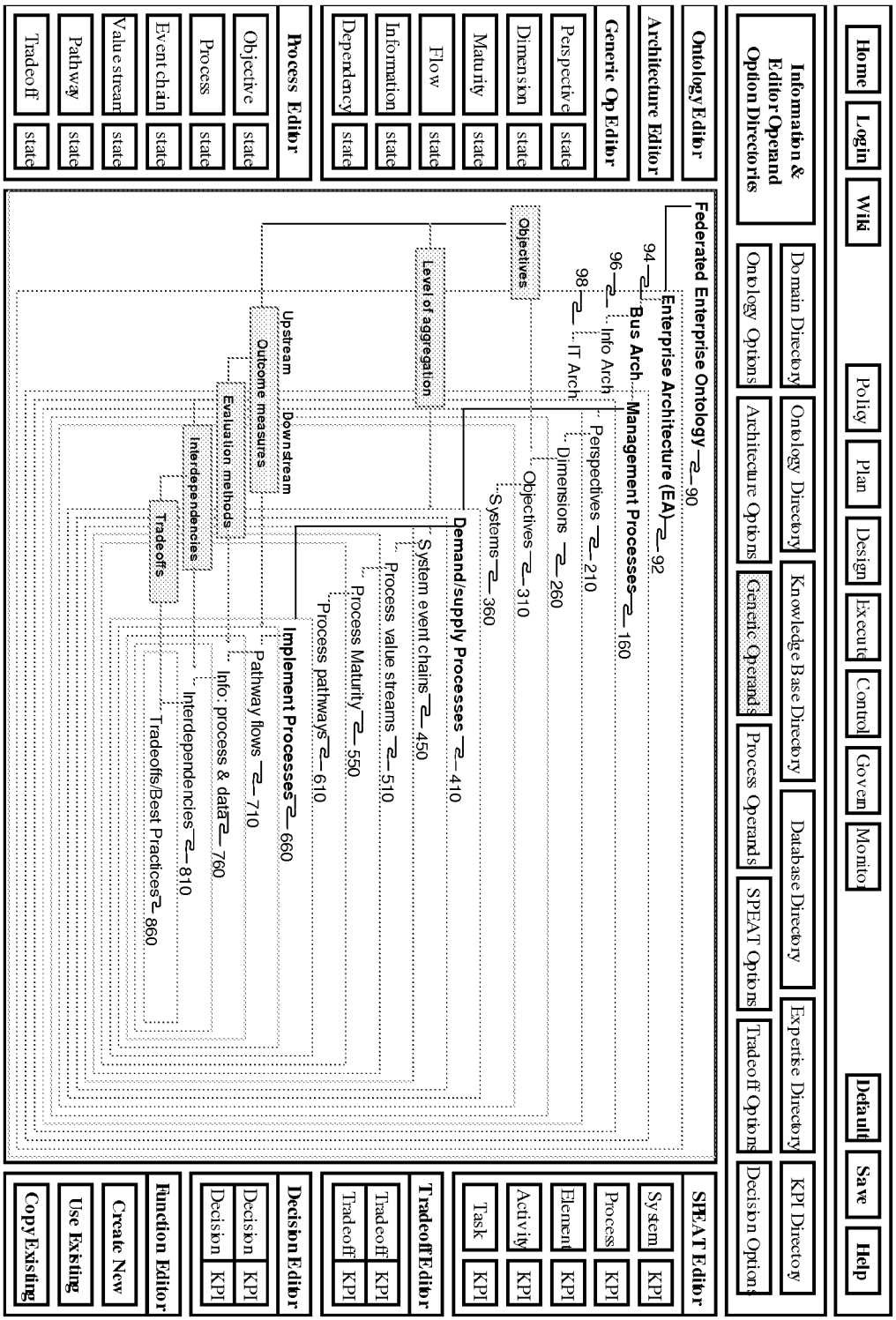
FIG. 7 shows twelve (12) process operands that are common to all ecosystems. Many (but not all) of these are inherent in the Zackman Framework (shown in FIG. 15) in the prior art where they are in a matrix form that does not guide their application in any preferred way or order and no such order has been intuitive to those skilled in the art to date. While these 12 may be applied to any process in any order, there is a preferred hierarchical alignment described in this invention where they align as in FIG. 7: management process operands—perspectives, dimensions, objectives, and systems; demand/supply process operands—system event chains, process value streams, process maturity, and process pathways; implementation (support) processes—pathway flows, information types, interdependencies, and tradeoffs.

In FIG. 5, management process operand 160 has several states including a strategy process 165; an environment, health and safety process 170, a knowledge management process 175 and an external relations process 180. FIG. 7 shows four generic management process operands that apply to each of the four process states—perspectives 210, dimensions 260, objectives 310, and systems 360.

Demand/supply process operand 410 also has four states including the market and sales process 415, a customer process 420, a product design and development process 425, and a product/service delivery process 430. FIG. 7 shows four generic demand/supply process operands that apply to each of these four states—system event chains 450, process value streams 510, process maturity 550 and process pathways 610.

The implementation process operand 660 includes the four ERP (enterprise resource planning) process states—the human resource process 665, the finance process 670, the information technology process 675, and the physical asset process 680. FIG. 7 shows the last four generic implementation process operands that may apply to any or all of these—pathway flows 710, types of pathway flow information 760, process and pathway interdependencies 810 and tradeoffs 860. FIG. 7 also shows an incomplete set of several health research operands used in prior art RAND evaluation models but not within a generic framework. FIG. 12 also shows various biological ecosystem operands—organism events 465, physiological events 470, cellular events 475, molecular events 480 and gene events 490—and process pathways for molecular signaling 615, and sub—pathway binding 620—that may be aligned with operands in this invention but again there is no complete operand set for these in the prior art.

While there are sets of four operands that generally align within each of the three architecture operands there is also alternate operand classifications that are helpful. These are (i) generic process operand, (ii) process specific operand and (iii) process level operand classifications.

3. Generic Process Operands

Six process operands are generic and apply to all types of processes in all types of ecosystems. They are ecosystem independent and shown in FIG. 8. The other six are more ecosystem-specific. These include perspectives 210, dimensions 260, maturity 550, types of pathway flows 710, types of information 760 and types of process interdependencies 810. These generic process operands and their operand states are also shown in FIG. 9.

Perspectives operand states include organization 215, function 220, internal views 225, and external views 230. Examples of sub-states are shown in FIG. 13 for organization operand 215 that include executive 216, management 217, director 218, and employee 219. Internal perspective operand 225 sub-states may include environment, health and safety 226, knowledge management and research 227, policy 228 and communication 229. External perspective operands 230 may include partners 231, clients 232, financiers 233 and regulators 234. Function perspective operands 220 may include management strategy 160, design/make 410, implement 660, and control. These functional sub-states mirror the major process category functions.

These types of perspective operand states, called views by IDS Scheer, are shown in FIG. 14 for the 'ARIS house' as organizational view, data view, control view, function view and product/service view. This 2D representation of ARIS is extremely limited in its coverage of perspectives as well as the other 5 generic operands. Equally, the Zachman 6×6 matrix representation in FIG. 15 provides operand relationships but is generally used only as a check list.

The second generic process operand dimensions 260 has states including economic 265, environment/social 270 (which may be further sub-divided), information technology 275 and policy 280.

The third generic process maturity operand 550 has six states including 'as is' 555, 'to be' 560, 'variance' between as is and to be" 565, a 'solution' addressing the variance 570, 'implementation' of that solution 575, and 'measurement' of improvement 580. It may be applied to all enterprise architecture (EA) models and standardize prior art maturity models (MM) to eliminate differing definitions and numbers of steps shown in FIGS. 15 and 16.

The fourth generic process operand is pathway flow 710 with states including work flow/transaction flow 715, information/collaboration flow 720, and value flow 725. Types of process pathway flows may be stage-to-stage, level-to-level and process-to-process similar to types of process interdependency operands 815, 820 and 825.

Existing business process management (BPM) and business intelligence (BI) software applications do not provide key performance metrics (KPIs) for all three types of flows only focusing presently towards work and transaction flow.

One example for the knowledge management (research and development (R&D) innovation) process that does show process interdependency relationships is described in U.S. patent Applications 60/774,597 Feb. 21, 2006 and 11/676,305 Feb. 18, 2007 by Cornford which is incorporated by reference herein. There is no current system in the prior art for measuring process interdependencies which is needed to support informed decision tradeoffs. This capability is an aspect of this invention.

The fifth generic process operand is type of information 760 with states including knowledgebase's 765, databases 770 and wiki 775.

Information is the sum of data and process knowledge. Knowledge exists in the form of formulae or algorithms which describe cause/effect relationships and process dynamics that may be predicted via models. Prior art process pathway information has focused almost exclusively on key performance indicators (KPIs) based on data. Few have focused on enterprise process knowledge similar to several process pathway knowledgebase's being developed for human biological ecosystems such as the US National Institute of Health (NIH) Reactome (www.reactome.org), the International Regulome Consortium (IRC) and others for cancer research. These are utilized by this invention.

Standard process ontology and knowledgebases are required to enable delineation of process interdependencies for informed tradeoff decision-making. These as aspects of this invention. To develop sufficient density of knowledge understanding for a large number of potential process pathway thread options, methods such as internet 'wiki' facilitate collection, curation and information sharing. For example there is a curated biological pathway knowledgebase Reactome and a knowledge acquisition method Reactomewiki in the prior art. However The Reactomewiki method and all others in the prior art addresses only a very few process layers in the ecosystem framework structure. They all require a system, method and device as defined in this invention, and illustrated in FIGS. 1-29 to address process knowledge aggregation, quality assurance for informed decision-making at all levels and across all levels of ecosystem structure.

The sixth generic process operand is type of interdependencies 810. The most common operand states are stage-to-stage 815, level-to-level 820, and process-to-process 825 that may also align with pathway flows.

Figure 8:
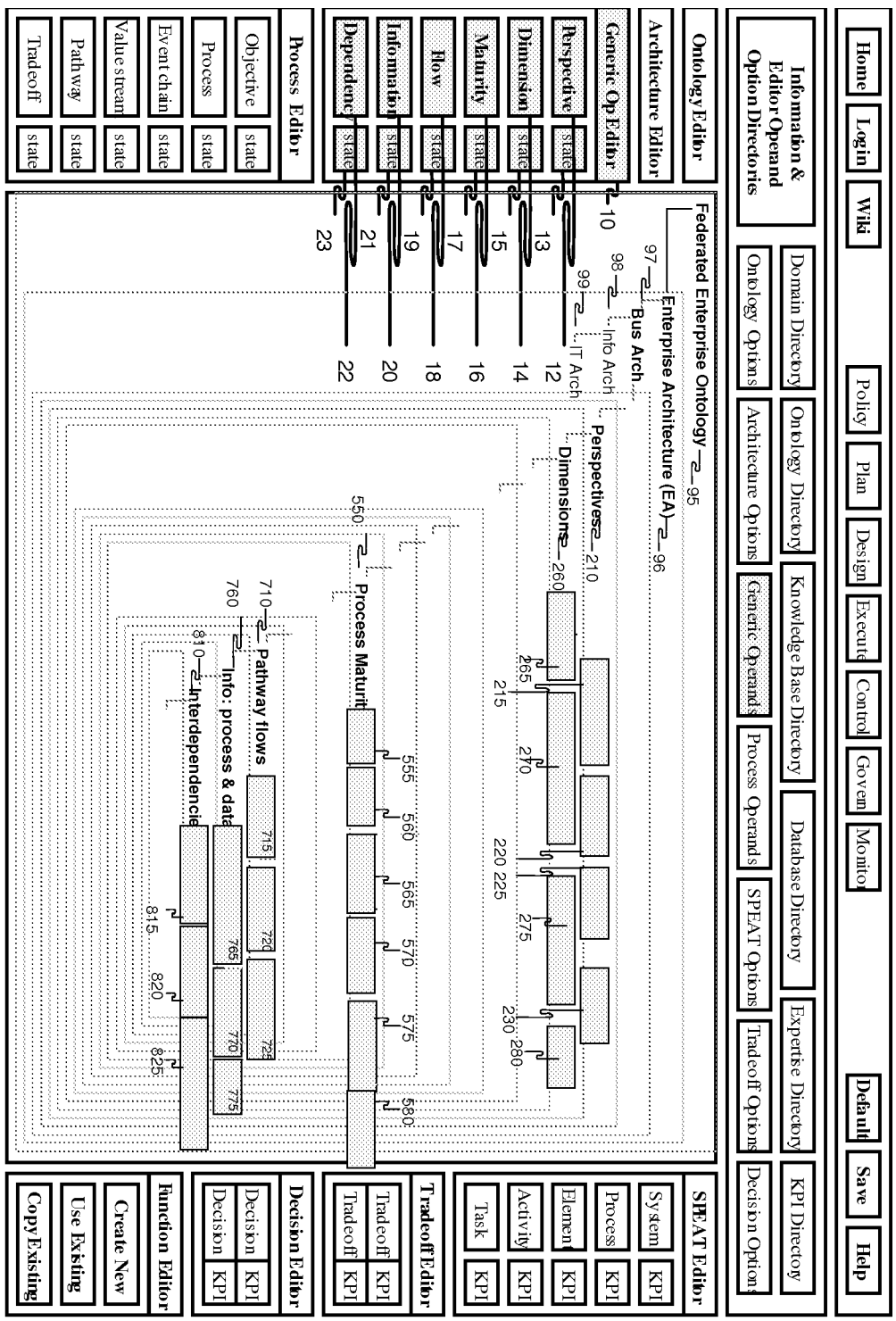
FIG. 8 shows six (6) of the 12 operands which are 'generic' and that generally apply to all processes independent of the process ecosystem or domain. These include (i) perspectives/views, (ii) dimensions, (iii) maturity, (iv) types of pathway flows, (v) types of information, and (vi) types of interdependencies. The FIG. 8 also shows the generic operand editor for each of these.
Figure 9:
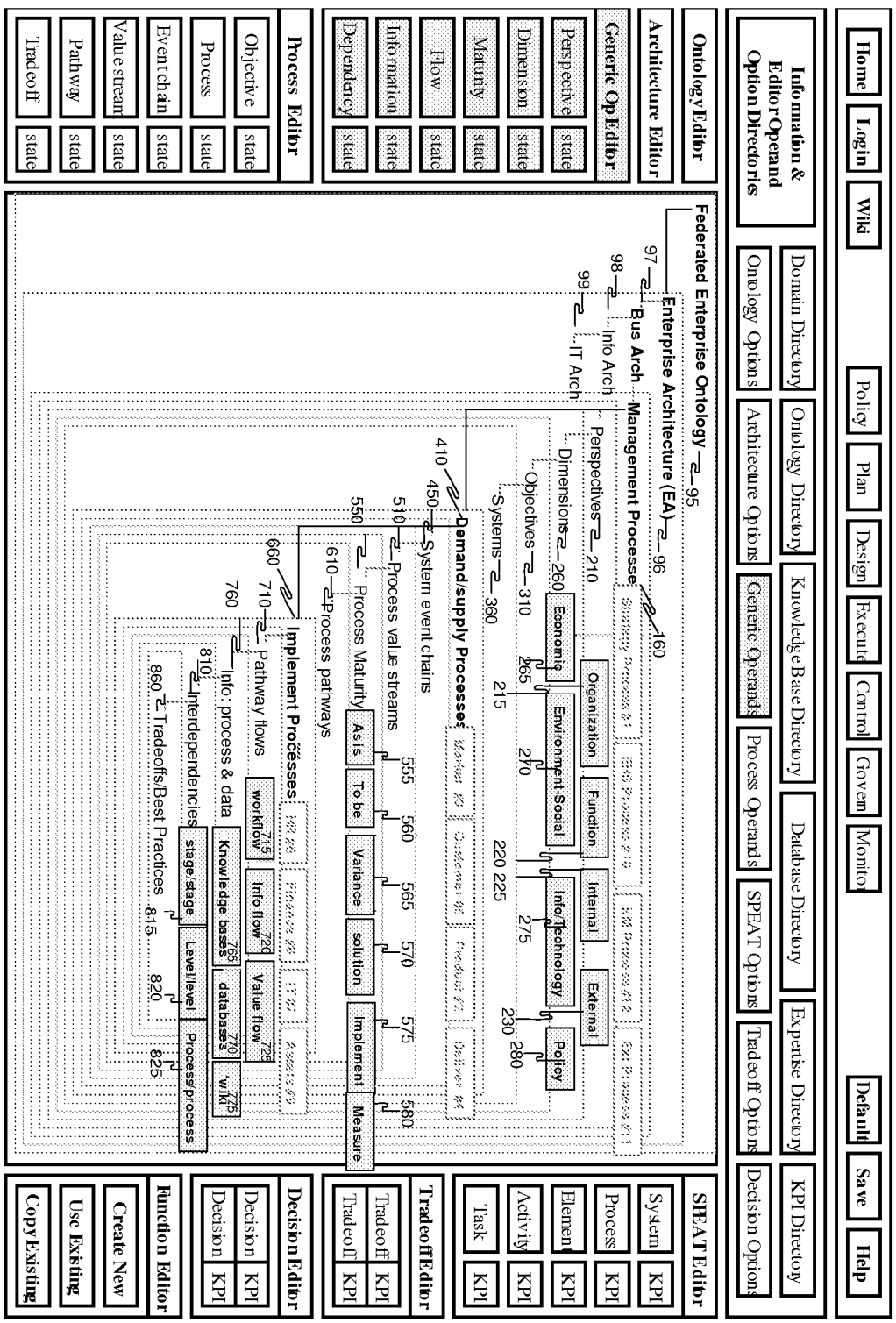
FIG. 9 shows common examples of generic process operand states. One set of 'perspectives' operand states include: (a) organization, (b) function, (c) internal, and (d) external. A set of 'dimensions' operand states is: (a) economic, (b) environmental/social, (c) technology, and (d) policy. There are six (6) generic process 'maturity' operand states (a) 'as is', (b) 'to be', (c) 'variance', (d) 'solution', (e) 'implement', and (f) 'measure'. 'Pathway flow' operand states include (a) work/ transaction flow, (b) information flow, and (c) value flow. 'Information' operand states include (a) knowledgebase's, (b) databases, and (c) 'wiki' information. 'Interdependencies' operand states include (a) stage-to-stage, (b) level-to-level, and (c) process-to-process.

These six common operands and their states are shown together in FIGS. 8 and 9.

4. Process-Specific Operands

There are six process-specific process operands that define important system and process characteristics driving core competencies of ecosystems and enterprises. These include (management process) objectives 310 and systems 360, (demand/supply process) system event chains 450, process value streams 510, and process pathways 610, and (implementation process) operand tradeoffs/best practices 860 shown in FIG. 10.

Some of these six operands and their states will be much more important than others in contributing to various decision 'threads' that may be used to assess enterprise value and/or competitiveness for specific enterprise ecosystems individually or collectively in federations.

These operands integrally link management, demand/supply and implementation processes providing the 'agility' sought in business process management (BPM) and business intelligence (BI).

An example of operand states and types of product applications for the management strategy process objective operand 310 and systems operand 360, as well as for the demand/supply product design process maturity operand 550 are shown in FIG. 18 as described by IDS Scheer for the product supply chain. These are just a very few of the operands and their operand states of the more comprehensive structure in this invention. The 'thread' linking these three operands is shown in FIG. 22 and a general illustration of 'threads' within and among sub-structure is shown in FIG. 19.

5. Process level operands (SPEAT)

There is a third set of process 'SPEAT' operands that characterize process levels—(a) system, (b) process conformation, (c) process element, (d) process element activities, and (e) activity tasks shown in FIGS. 11,12 and 13. These are described in the prior art by SCOR, VRM and PWC but still not standardized nor integrated with enterprise architecture, business process architecture, information and value architectures.

These process sub-levels also relate to and align with organizational sub-levels as defined by one of the generic operands—'perspectives'—as shown in FIG. 11. This inter-relationship is just one example of the myriad of other relationships that exist within the complex ecosystem process structure, and one example of why there has been no standard prior art representation of ecosystem complexity or how it may be readily navigated. This invention resolves this need.

The enterprise structure in FIG. 11 is universal. It applies equally well for enterprise ecosystems as well as for biological (human) ecosystems. Both sets of definitions align within a common ontology and framework (some of which are shown at the bottom of the figure) for both 'process specific' operands and 'SPEAT' process sub-level operands at all levels of federation and aggregation from body to organ to tissue to cell including the cellome, proteome, genome, phenome, reactome, regulome, transcriptome and others.

6. Threads

Several embodiments of the invention provide examples of decision 'threads' that include many of the 12 process operands. A number of these are shown for knowledge management (R&D innovation) processes in FIG. 27, healthcare processes in FIGS. 25 and 26, biomass energy processes in FIG. 28 and emergency response processes in FIG. 29. This demonstrates generic applicability of the framework and all operands in many types of ecosystems.

A majority of enterprise architecture and process operation reference model focus in the prior art has been product design and development for supply chain management (SCM). SCM applications of Microsoft Dynamics, Oracle PIP, SAP PLM, NPDI, CRM, SCM and others are designed to manage work flow and transaction flow for product supply chains. While complex, the new product design/develop process 425 and 'threads' through it are reasonably well defined as shown in the IDS Scheer representation in FIG. 18.

However there are few decision 'threads' readily transparent in the prior art, except for aspects of the SCM process. Without common definition of all 12 enterprise processes, and common framework as described in this invention to facilitate their navigation, there has been very limited ability to address process interdependencies, tradeoffs and true business agility. There has also been little ability to determine which operands and operand states matter most for specific ecosystem competitiveness, a feature of the current invention.

An embodiment providing an example 'thread' that links important operand states for knowledge management (R&D innovation) processes is shown in the left portion of FIG. 27. The operand states in the 'thread' are shaded in the body of the figure. The focus of this ecosystem assessment is determination of the optimal tradeoff balance among investments in public and private R&D processes, human resources and risk financing for optimizing overall innovative capacity of federations of enterprises, and particularly, states, regions and nations.

The 'thread' links the knowledge management innovation process 175, executive perspective 216, economic dimension 265, innovative capacity objective 325, and disruptive research and development (R&D) system 365. This management context is then linked with the demand/supply new product process 425, for the R&D system event chain 455, the public R&D, private R&D and highly qualified people (HQP) process value streams 515, 520 and 525 respectively, and the 'as is' process maturity state 555 and process pathways 615, 620 and 625. This demand/supply context is then linked to implementation human resource and information technology processes 665 and 670, focusing on new product pathway deal flow 716, innovative capacity pathway information 766, and interdependencies among public R&D, Private R&D and HQP 866, 867 and 868 respectively. The upstream and downstream order of these interdependencies and tradeoff ratios is shown in the lower portion of FIG. 27 and described in detail in U.S. patent application Ser. No. 12/344,350 and U.S. Provisional Patent Applications 60/774,597 Feb. 21, 2006 and 11/676,305 Feb. 18, 2007 by Cornford.

A second ecosystem example 'thread' links important operand states for assessing healthcare tradeoff decisions for optimizing treatment service protocols for breast cancer patients shown in FIGS. 25 and 26.

This example 'thread' links the healthcare management process 170, for the patient customer perspective 232, the physiology dimension 260, the quality service objective 321, within the continuum of care diagnostic system 375. This management context is then linked with the demand/supply health service delivery process 430, via the gene expression event chain system cancer focusing on limitless cell replication 480, as this relates to breast cancer value streams 542, and the current 'as is' ability to diagnose this condition 562 as evidenced by hormone pathways 612. This demand/supply context is then linked to implementation information technology processes 675, focusing on hormone pathway process knowledge flow 720, via the Reactome knowledgebase 775, for up and down gene regulation interdependencies 816 that may lead to treatment tradeoff decision options 860.

Multiple 'threads', or portions of them comprised of only a few operand states, may be viewed from any particular perspective such as the patient perspective 165. This may require balancing among all 4 dimensions—economic 265, physiological 275, social and cultural 270 and other demographic, location and environmental issues 275 as shown in FIG. 25 in order to assess key interdependencies influencing patient benefits 881. Any of these separate 'thread' perspectives may include the patient 165, the health agency 170, the researcher 175 or the funding agency 275 as shown in FIG. 26 along with each of the benefits from each perspective 881, 882, 883 and 884 respectively.

A third example decision 'thread' relates to assessment of return on investment (ROI) options for investments in bioenergy technology opportunities shown in FIG. 28.

This 'thread' links the investment management strategy process 165, with bioenergy (technology) operation opportunities 218, in the economic dimension 265, to determine investment competitiveness 316, related to bioenergy conversion systems 376. This management context is linked with the demand/supply new product development process 425, in the primary conversion event chain 475, via gasification conversion value stream 541, for a comparative competitive 'as is' ROI state 555, for thermo-chemical pathways 616. This demand/supply context is then linked to the implementation finance processes 670, focusing on value flow 725, that may be compared with European Union biofuels technology platform technologies 762, by balancing food/fiber/fuel value interdependencies 821, to evaluate best return on investment tradeoffs 872.

A fourth decision 'thread' example facilitates assessment of emergency preparedness and response to security threats and events. This links the safety management process 170, response operations 216, for meeting responsiveness objectives 313 within the emergency response system continuum 371. This management context is linked with the demand/supply communications delivery process 410, via the response event chain 462 via mass communications value streams 522, based on 'as is' capability for small entities 556, employing various communication response pathways 622.

This demand/supply context is then linked to implementation information technology communication processes 675, focusing on communications information flow 720, via an integrated information knowledgebase system 776, with voice, e-mail, computer and other communications pathway interdependencies 816, leading to best communications tradeoffs for various client options 860. The six generic maturity operand states align well with the Homeland Security NIPP emergence preparedness strategy.

7. Key Performance Indicators (KPIs), Process Interdependencies and Best Practices Key performance indicators (KPIs) are documented in the KPI directory and principally align with the process operand editors for SPEAT 38, tradeoffs 50, decisions 54 as well as their states including maturity 550, pathway flows 710, interdependencies 810 and tradeoffs/best practices 860. For process maturity 550, the 'as is' state 555 may be defined by 'data' best practices at a single point in time. However the 'to be' state 560 requires 'process knowledge' to define a process best practice. In the absence of common individual process definitions, best practices in the prior art can only address an aggregate outcome of all processes taken together, providing a 'macro' best practice view rather than an assessment of any individual process or process interdependency except perhaps for well understood aspects of the SCM product supply chain process.

Therefore existing BPM and BI KPIs and best practice systems are unable to provide detailed process interdependency best practices such as those provided in this invention and described in the U.S. Patent application 60/774,597 Feb. 21, 2006 and 11/676,305 by Cornford that is incorporated by reference here for the knowledge management process, its sub process and other processes in federations of enterprises.

An example of process-to-process 825 best practice interdependency ratios is shown in the lower portion of the FIG. 27 tradeoffs 866, 867 and 868 for the knowledge management innovation R&D process which has several sub-processes. The private R&D sub-process produces 15 times the new product output of the public R&D sub-process but is dependent upon the public R&D sub-process for creation of the human resources required to undertake the private R&D. The best practice interdependency ratio 866 is not 15/1 but closer to 3/1 for optimizing innovation R&D output for federations of public and private enterprises. The best practice private R&D/HQP interdependency ratio 867 is 3/2. In the downstream commercialization portion of the innovation and commercialization process, the best practice product opportunity/risk capital interdependency ratio 868 is 4/1 as described in further detail in US Patent Application 66/305,477.

In a second process interdependency tradeoff example, a key strategic value is customer satisfaction and loyalty for maintaining and building market share. This may mean trading off additional expense in holding high inventory levels for good order velocity quality, or on the other hand, sacrificing customer responsiveness for lower costs. This process-to-process 825 interdependency tradeoff is between two demand/supply processes, customer 420 and deliver 430. In the first case the enterprise is willing to pay the price of higher inventory holding costs so it can always respond to customers quickly. In the second case, the enterprise chooses to sacrifice customer responsiveness for a strong cost culture. Excelling at both supply chain cost minimization and perfect order demand responsiveness would be best but may still require a tradeoff to attain strategic customer loyalty and market share objectives.

In a third process interdependency example, there is often a tradeoff between the strategic value of innovation 175 versus the added risks of change and R&D. There are cultural 270 tradeoffs with increased risk, failures and 'trial and error', and tradeoffs with intellectual property (IP) control versus IP sharing for greater levels of patent output, new products and revenues that may be increased up to 50% or more through collaboration.

A last tradeoff example is shown in the lower portion of FIG. 28 where tradeoff options may be weighed among various commercialization opportunities.

8. Method and Device

This invention is comprised of a system, method and device.

The system and framework in the invention provide the ability for one skilled in the art to define and align ecosystem ontology, architecture, processes, and sets of process operands and operand states within a generic nested set hierarchy as taught in the invention. These provide for commonality among enterprise architecture models, operations reference models and maturity models. The system simplifies navigation of ecosystem complexity via its nested set partitions. The identification and selection of operands and operand states further assist identification of key processes, process interdependencies and potential decision tradeoffs. Therefore the system facilitates the transform process whereby processes transform various articles (individually and collectively), that is, input resources of labor, information technology, finances and assets into other things and products in altered forms of valued system outputs including improved process operations, process interdependency understanding, improved velocity of system workflow, information flow, collaboration and/or value flow.

The substantive method in the invention is the development and use of different kinds of operands, operand states and operand editors and state editors to transform processes and process components to states and forms having higher value. The method of generically defining and classifying architecture and process attributes as they may aid decision making is unique to the prior art. The method of integrating and unifying these articles and operands in a single generic system, structure and device is also unique. This method of defining enterprise architectures and processes also permits the alignment of major literature models, coding and other development practices in the literature to aid interoperability to a novel extent.

For example, the generic maturity method operand states 555-580 provide a common maturity method for optimizing enterprise performance in all ecosystems. Likewise, the method readily incorporates the steps 901-910 in FIG. 20 for implementing enterprise (business) process definition to process execution are similar to those described in the prior art by IDS Scheer. These include service oriented process modeling 901, importing and scoping existing services and data 902, completing processes by services and data 903, process to IT process transformation 904, completing process IT design 905, exporting and adapting IT process 906, importing IT process 907, importing and scoping existing services and data 908, service-oriented process modeling 909, and service-oriented process modeling 910. These steps are implemented in software applications such as those by SAP, Microsoft and others for SCM (PLM, NPDI, CRM) processes which may be adapted for a much broader set of processes and extending beyond just workflow and transaction flow 715 to information/collaboration 720 and value flow 725.

The invention defines a unique device for creating, editing, using and transforming aspects of ecosystem ontology, architecture, processes, process operands and process operand states all within a single framework. The device has specific and unique features and combinations of features that are novel to the prior art. While the device design features are unique their collective effect is to enable utility that is applicable for all types of ecosystem processes and process interdependencies to aid assessment of processes, process interactions, process interdependency tradeoff best practices to improve ecosystem functions, competitiveness and/or produce higher value. There are no devices currently described in the prior art or in the market place that will facilitate these functions that are capabilities of this invention.

The invention may be rendered into practice and implemented via combinations of computer software and hardware that function together as an electronic system and device with major features shown in FIG. 1 including general application functions for: policy 84, plan 85, design 86, execute 87, control 88, govern 89, monitor 90, editor operand directories 70, 'wiki' 93, knowledge bases 76, databases 78, ontology editor 2, architecture editor 4, generic process operands 10, process specific operand editor 24, process level editor 38, tradeoff editor 50, decision operand editor 54, and function editor 58 for creating 60, using 62, copying 64 or transforming architecture and/or processes.

What is claimed is:

1. A computer processor unit (CPU) software comprising: a processor displaying editors within an editor dashboard, said dashboard editors comprising a hierarchy wherein: (i) an ontology editor contains (ii) an architecture editor comprised of an enterprise architecture (EA), said enterprise architecture containing a business process architecture, said business process architecture containing an information architecture, said information architecture containing an information technology (IT) architecture; and (iii) within said business process architecture editor there are editors defining twelve process states: (a) perspectives, (b) dimensions, (c) maturity, (d) flows, (e) information, (f) dependencies, (g) objectives, (h) processes, (j) event chains, (k) value streams, (l) pathways and (m) tradeoffs where said twelve process states also align within a process hierarchy of: (i) four management processes each with four states defining (a) perspectives, (b) dimensions, (c) objectives, and (d) systems, within which there are (ii) four demand/supply processes each with four states defining (e) system/process event chains, (f) process value streams, (g) process pathways, and (h) process flows, within which there are (iii) four implementation processes each with four states defining (j) maturity, (k) information: process and data, (l) interdependencies and (m) tradeoffs/best practices, and said dashboard is implemented by: (i) first, identifying and selecting an ontology state within the ontology editor; (ii) second, for said ontology selection, identifying and selecting an architecture state within the architecture editor; (iii) third, for said architecture state, selecting and recording process states for management process perspectives, dimensions, objectives, and systems; for demand/supply process event chains, value streams, pathways, and flows; and for implementation process maturity, information, interdependencies and tradeoffs; (iv) fourth, combining and displaying all said process selections in the dashboard within a hierarchy; (v) fifth, repeating said five steps selecting and recording one or more alternate process states and combining and displaying said second set of state selections in the dashboard within a hierarchy; (vi) sixth, repeating said steps any number of times analyzing different combinations of said process states and (vii) seventh, utilizing said differences for finding optimal combinations of states for improving process flow for an enterprise process or combination of processes.

2. A computer processor in claim 1 wherein the process editors display combinations of process states in decision threads configured for commerce, health, oncology, bioenergy, emergency, and research and development process and process interdependency output analysis.

* * * * *